US012322307B2

(12) United States Patent
Tanaka

(10) Patent No.: US 12,322,307 B2
(45) Date of Patent: Jun. 3, 2025

(54) DRIVER AND ELECTRO-OPTICAL DEVICE

(71) Applicant: SEIKO EPSON CORPORATION, Tokyo (JP)

(72) Inventor: Kazuaki Tanaka, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/442,227

(22) Filed: Feb. 15, 2024

(65) Prior Publication Data

US 2024/0282226 A1 Aug. 22, 2024

(30) Foreign Application Priority Data

Feb. 16, 2023 (JP) ................................ 2023-022155

(51) Int. Cl.
*G09G 3/00* (2006.01)
*G09G 3/36* (2006.01)

(52) U.S. Cl.
CPC ........... *G09G 3/006* (2013.01); *G09G 3/3696* (2013.01); *G09G 2300/0426* (2013.01); *G09G 2330/12* (2013.01)

(58) Field of Classification Search
CPC ................ G09G 3/006; G09G 3/3696; G09G 2300/0426; G09G 2330/12
See application file for complete search history.

(56) References Cited

U.S. PATENT DOCUMENTS

| | | | | |
|---|---|---|---|---|
| 4,734,688 A * | 3/1988 | Adams | G06F 11/162 | 349/33 |
| 5,583,528 A * | 12/1996 | Ebihara | G09G 3/20 | 345/94 |
| 7,705,834 B2 * | 4/2010 | Swedin | G09G 3/04 | 178/18.05 |
| 12,062,306 B2 * | 8/2024 | Okada | G09G 3/006 | |
| 2012/0249505 A1 * | 10/2012 | Pietro | G09G 3/04 | 345/208 |

(Continued)

FOREIGN PATENT DOCUMENTS

| | | |
|---|---|---|
| JP | 2020-085476 A | 6/2020 |
| JP | 2021-056344 A | 4/2021 |

(Continued)

*Primary Examiner* — William Lu
(74) *Attorney, Agent, or Firm* — Harness, Dickey & Pierce, P.L.C.

(57) ABSTRACT

A driver includes a first terminal, a second terminal coupled to the first terminal via a transparent electrode, a first drive circuit, a second drive circuit, and a monitor circuit that detects a resistance value of the transparent electrode based on a voltage of the second terminal in a monitoring state. The monitoring state is a state in which the first terminal is coupled to a first high-potential-side power supply voltage via the first drive circuit and the second terminal is coupled to a second high-potential-side power supply voltage different from the first high-potential-side power supply voltage via the second drive circuit, or a state in which the first terminal is coupled to one of a high-potential-side power supply voltage and a low-potential-side power supply voltage via the first drive circuit and the second terminal is coupled to the other of the high-potential-side power supply voltage and the low-potential-side power supply voltage via the second drive circuit.

11 Claims, 17 Drawing Sheets

(56) References Cited

U.S. PATENT DOCUMENTS

| | | | | |
|---|---|---|---|---|
| 2016/0247458 | A1* | 8/2016 | Muto | G06F 1/3265 |
| 2017/0032721 | A1* | 2/2017 | Atkinson | G09G 3/16 |
| 2017/0292933 | A1* | 10/2017 | Rilum | G01N 27/44769 |
| 2018/0018913 | A1* | 1/2018 | Kim | G09G 3/2092 |
| 2018/0174505 | A1* | 6/2018 | Mandlik | G09G 3/3677 |
| 2020/0135153 | A1* | 4/2020 | Ogawa | G09G 3/006 |
| 2020/0160766 | A1* | 5/2020 | Ito | G09G 3/006 |
| 2020/0169437 | A1* | 5/2020 | Miyashita | G06F 1/105 |
| 2020/0211491 | A1* | 7/2020 | Muraki | G09G 3/3648 |
| 2021/0097953 | A1* | 4/2021 | Tanaka | G09G 3/3696 |
| 2021/0158771 | A1* | 5/2021 | Tanaka | G09G 3/3696 |
| 2023/0063763 | A1* | 3/2023 | Tanaka | G02F 1/13306 |

FOREIGN PATENT DOCUMENTS

| | | |
|---|---|---|
| JP | 2021-081639 A | 5/2021 |
| JP | 2023-034746 A | 3/2023 |

* cited by examiner

| | DISPLAY STATE | | MONITORING STATE |
|---|---|---|---|
| | ONE-LINE DRIVING | TWO-LINE DRIVING | |
| SA | OFF | OFF | ON |
| SB | OFF | ON | ON |
| DTa | DISPLAY DATA | DISPLAY DATA | FIRST DATA |
| DTb | Don't care | =DTa | SECOND DATA |

FIG. 14

| | DISPLAY STATE | | MONITORING STATE |
|---|---|---|---|
| | ONE-LINE DRIVING | TWO-LINE DRIVING | |
| SAa | OFF | OFF | OFF |
| SBa | Don't care | Don't care | Don't care |
| SAb | OFF | OFF | ON |
| SBb | OFF | ON | ON |
| DTa | DISPLAY DATA | DISPLAY DATA | FIRST DATA |
| DTb | Don't care | =DTa | SECOND DATA |

FIG. 16

| | DISPLAY STATE | MONITORING STATE |
|---|---|---|
| | TWO-LINE DRIVING | |
| SAa | OFF | OFF |
| SBa | Don't care | Don't care |
| SAb | OFF | ON |
| SBb | Don't care | OFF |
| DTa | DISPLAY DATA | FIRST DATA |
| DTb | =DTa | SECOND DATA |

*FIG. 18*

| | DISPLAY STATE | |
|---|---|---|
| | ONE-LINE DRIVING | TWO-LINE DRIVING |
| SAa | OFF | OFF |
| SBa | OFF | ON |
| SAb | OFF | OFF |
| SBb | OFF | ON |
| DTa | DISPLAY DATA | DISPLAY DATA |
| DTb | DISPLAY DATA | DISPLAY DATA |

DRIVER AND ELECTRO-OPTICAL DEVICE

The present application is based on, and claims priority from JP Application Serial Number 2023-022155, filed Feb. 16, 2023, the disclosure of which is hereby incorporated by reference herein in its entirety.

BACKGROUND

1. Technical Field

The present disclosure relates to a driver, an electro-optical device, and the like.

2. Related Art

JP-A-2020-085476 discloses a display device including a display panel formed on a transparent substrate and a display driver that drives the display panel. A first evaluation bump and a second evaluation bump are provided on a coupling surface of the display driver in addition to signal transmission bumps. Evaluation electrodes are provided on the transparent substrate at positions corresponding to the first evaluation bump and the second evaluation bump. After COG mounting, a resistance value evaluation circuit provided in the display driver generates an evaluation signal corresponding to a resistance value between the first evaluation bump and the second evaluation bump via the evaluation electrodes.

JP-A-2020-085476 is an example of the related art.

SUMMARY

In JP-A-2020-085476, it is necessary to provide bumps dedicated to evaluation, and there is a problem that the signal transmission bumps that drive the display panel cannot be evaluation. Providing the bumps dedicated to evaluation may cause problems such as an increase in a chip area of the driver, or the need to provide electrodes dedicated to evaluation on a panel side.

An aspect of the disclosure relates to a driver including: a first terminal; a second terminal coupled to the first terminal via a transparent electrode provided at an electro-optical panel; a first drive circuit coupled to the first terminal and configured to drive the first terminal; a second drive circuit coupled to the second terminal and configured to drive the second terminal; and a monitor circuit configured to detect a resistance value of the transparent electrode based on a voltage of the second terminal in a monitoring state, and the monitoring state is a state in which the first terminal is coupled to a first high-potential-side power supply voltage via the first drive circuit and the second terminal is coupled to a second high-potential-side power supply voltage different from the first high-potential-side power supply voltage via the second drive circuit, or a state in which the first terminal is coupled to one of a high-potential-side power supply voltage and a low-potential-side power supply voltage via the first drive circuit and the second terminal is coupled to the other of the high-potential-side power supply voltage and the low-potential-side power supply voltage via the second drive circuit.

Another aspect of the disclosure relates to an electro-optical device including the above-described driver and the electro-optical panel provided with the transparent electrode.

BRIEF DESCRIPTION OF THE DRAWINGS

FIG. 14 shows an explanatory diagram of operations of the drive circuit and the monitor circuit in the first coupling example.

FIG. 16 shows an explanatory diagram of operations of the drive circuit and the monitor circuit in the second coupling example.

FIG. 18 shows an explanatory diagram of operations of the drive circuit and the monitor circuit in the third coupling example.

DESCRIPTION OF EMBODIMENTS

Hereinafter, a preferred embodiment of the disclosure will be described in detail. The embodiment to be described below is not intended to limit the contents described in the claims, and all of the components described in the embodiment are not necessarily essential components.

1. Driver, Electro-Optical Device, and Electronic Apparatus

Figure 1:
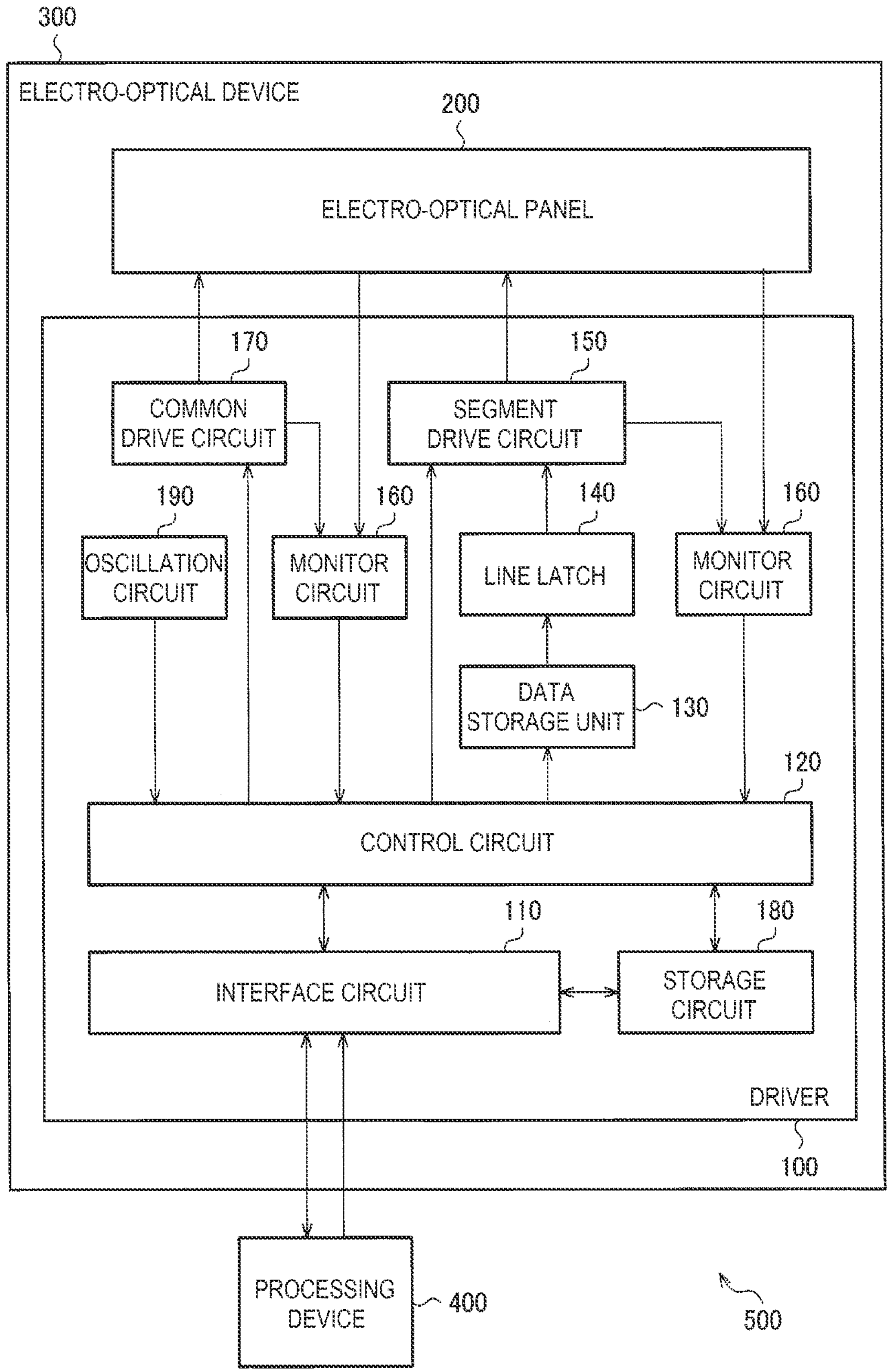
FIG. 1 shows a configuration example of an electronic apparatus including an electro-optical device according to an embodiment.

FIG. 1 is a configuration example of an electronic apparatus including an electro-optical device according to the embodiment. An electronic apparatus 500 includes a processing device 400 and an electro-optical device 300. The electro-optical device 300 includes an electro-optical panel 200 and a driver 100.

For example, a cluster panel mounted on a vehicle or a liquid crystal shutter used for controlling a headlight or the like can be assumed as the electro-optical device 300. The vehicle may include a two-wheeled vehicle, an automobile, a ship, an airplane, a robot, or the like. The cluster panel is a panel for displaying information such as icons, numbers, characters, or meters. The liquid crystal shutter is a liquid crystal panel provided between a light source and an object to be illuminated, and light distribution or an amount of illumination light of headlights or the like is controlled by controlling the liquid crystal panel. However, application of the electro-optical device 300 is not limited thereto.

The electro-optical panel 200 is a passive liquid crystal panel. That is, the electro-optical panel 200 includes a first transparent substrate, a second transparent substrate facing the first transparent substrate, and a liquid crystal filling a space between the first transparent substrate and the second transparent substrate. The first transparent substrate and the second transparent substrate are provided with transparent electrodes. When a voltage is applied between a transparent electrode on a f first transparent substrate side and a transparent electrode on a second transparent substrate side facing the first transparent substrate side, a transmittance of the liquid crystal therebetween changes due to the voltage. The transparent substrate is, for example, a glass substrate, and the transparent electrode is also referred to as a transparent conductive film and is made of, for example, ITO. ITO is an abbreviation of indium tin oxide.

The driver 100 drives the electro-optical panel 200 by outputting a voltage to the transparent electrode. The driver 100 is, for example, an integrated circuit device in which a plurality of circuit elements are integrated at a semiconductor substrate. The driver 100 is COG-mounted on a first glass substrate or a second glass substrate of the electro-optical panel 200. However, the driver 100 and the electro-optical panel 200 may be coupled via a flexible substrate or the like. Note that "coupling" in the disclosure is electrical coupling. The electrical coupling is coupling in which an electrical signal can be transmitted and information can be transmitted by the electrical signal. The electrical coupling may be coupling via a passive element or an active element.

The driver 100 includes an interface circuit 110, a control circuit 120, a data storage unit 130, a line latch 140, a segment drive circuit 150, a monitor circuit 160, a common drive circuit 170, a storage circuit 180, and an oscillation circuit 190.

The monitor circuit 160 monitors a temporal change of the electro-optical panel 200 by detecting a resistance value of the transparent electrode provided at the electro-optical panel 200. Hereinafter, this monitoring operation is also referred to as resistance monitoring. The monitor circuit 160 can execute resistance monitoring on any one or more outputs among a plurality of outputs including an output of the common drive circuit 170 and an output of the segment drive circuit 150.

The interface circuit 110 executes communication between the driver 100 and the processing device 400. Specifically, the interface circuit 110 receives display data for controlling display of each segment electrode from the processing device 400. For example, in a case of static driving, the display data is data for turning on or off the display of the segment electrode. Alternatively, in a case of performing PWM driving in the static driving, the display data is data for setting a display gradation of the segment electrode. The interface circuit 110 may receive, from the processing device 400, first data and second data for setting an output state of the segment drive circuit 150 during resistance monitoring. For example, a serial interface method such as an inter integrated circuit (I2C) method or a serial peripheral interface (SPI) method can be adopted as a communication method of 41 the interface circuit 110. Alternatively, a parallel interface method may be adopted as the communication method of the interface circuit 110. The interface circuit 110 may include an input and output buffer circuit and a control circuit that implement the communication method.

The processing device 400 is a host device of the driver 100, for example, a processor or a display controller. The processor is a CPU, a microcomputer, or the like.

The storage circuit 180 stores setting information for executing operation settings for the driver 100. The setting information includes, for example, information for setting a voltage value of a comparison determination voltage used for resistance monitoring. Alternatively, the setting information includes information for setting an output as a target of resistance monitoring among the plurality of outputs. Alternatively, the setting information includes the first data and the second data for setting the output state of the segment drive circuit 150 during resistance monitoring. The storage circuit 180 is a register, a volatile memory, a nonvolatile memory, or the like. The volatile memory is an SRAM, a DRAM, or the like. The nonvolatile memory is an OTP memory, an EEPROM, or the like. For example, the processing device 400 may write the setting information to the register or the volatile memory via the interface circuit 110. Alternatively, the setting information may be written in the nonvolatile memory at the time of manufacturing the driver 100, the electro-optical device 300, or the electronic apparatus 500.

The control circuit 120 is a logic circuit and operates based on a clock signal received from the oscillation circuit 190. The control circuit 120 controls a drive timing when the driver 100 drives the electro-optical panel 200. Specifically, the control circuit 120 stores the display data or the first data and the second data in the data storage unit 130. In each frame, the control circuit 120 controls the segment drive circuit 150 to output a drive signal corresponding to the drive data of the frame. The control circuit 120 executes control to invert drive polarity for each frame.

The data storage unit 130 stores the drive data from the control circuit 120. The data storage unit 130 is a so-called display data RAM. Alternatively, the data storage unit 130 may be a register. The line latch 140 latches the drive data for one frame read from the data storage unit 130.

The segment drive circuit 150 outputs a signal to a segment transparent electrode of the electro-optical panel 200 based on the drive data latched by the line latch 140. That is, the segment drive circuit 150 drives the segment electrode by outputting, from a segment terminal, a segment drive signal corresponding to the display data. A driving method may be various methods such as static driving, PWM driving, or duty driving. The segment drive circuit 150 outputs a first voltage set by the first data to one of two terminals coupled to the transparent electrode, and outputs a second voltage set by the second data to the other of the two terminals. In this monitoring state, the monitor circuit 160 detects a voltage of the one or the other of the two terminals, thereby detecting a resistance value of the transparent electrode coupled between the two terminals.

The common drive circuit 170 drives a common electrode of the electro-optical panel 200. That is, the common drive circuit 170 drives the common electrode by outputting, from a common terminal, a common drive signal corresponding to polarity.

When detecting an abnormality in the resistance value of the transparent electrode in the resistance monitoring, the monitor circuit 160 outputs a signal indicating the abnormality to the control circuit 120. The control circuit 120 notifies, via the interface circuit 110, a processing system outside the electro-optical device 300 of the abnormality. The external processing system may be the processing device 400 or an information processing device coupled via a network. The information processing device is, for example, a PC or a smartphone. When receiving a notification of the abnormality, the processing system executes processing corresponding to the notification. For example, the processing system displays, on a display of the processing system, information for notification of the abnormality in the electro-optical panel 200 or information for prompting replacement of the electro-optical panel 200. Alternatively, the processing system may display the information on the electro-optical device 300.

2. First Configuration Example

Figure 2:
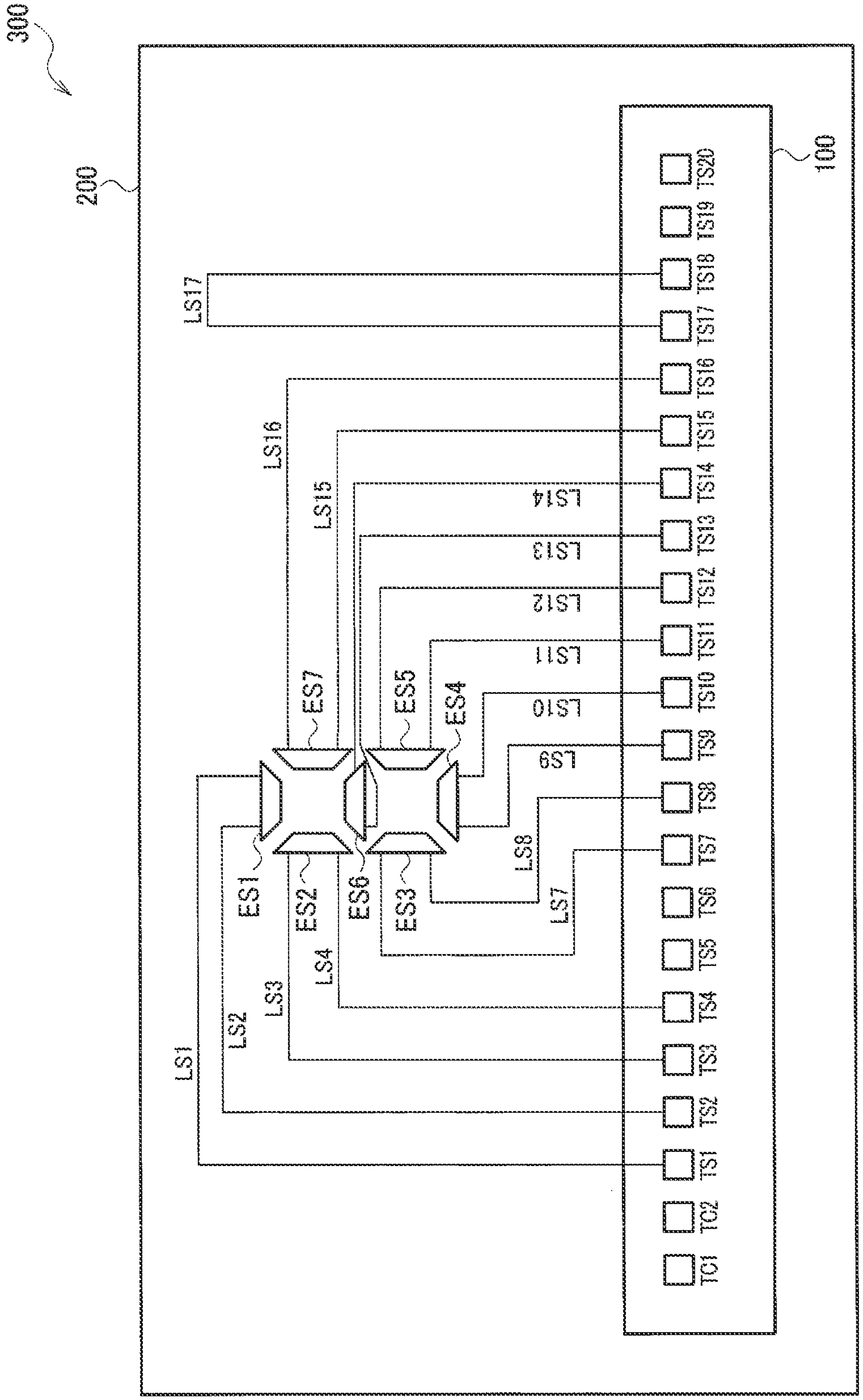
FIG. 2 shows an example of segment transparent electrodes of an electro-optical panel in a first configuration example and an example of coupling between the segment transparent electrode and a driver.

FIG. 2 shows an example of segment transparent electrodes of an electro-optical panel in a first configuration example and an example of coupling between the segment transparent electrode and a driver. The electro-optical panel 200 includes segment electrodes ES1 to ES7 and segment signal lines LS1 to LS4 and LS7 to LS17. The driver 100 includes segment terminals TS1 to TS20.

The driver 100 is mounted on a glass substrate of the electro-optical panel 200. Specifically, the driver 100 is an integrated circuit device, and pads provided at the semiconductor substrate correspond to the segment terminals TS1 to TS20. The semiconductor substrate is mounted on the electro-optical panel 200 such that a surface at which the pads are provided faces the glass substrate of the electro-optical panel 200. At this time, the segment terminals TS1 to TS20 are respectively coupled to the segment signal lines LS1 to LS20 via, for example, metal bumps. FIG. 2 also shows the segment terminals and the like that are originally hidden by the semiconductor substrate and cannot be seen.

The segment electrode ES1 is coupled to the segment terminal TS1 via the segment signal line LS1, and is coupled to the segment terminal TS2 via the segment signal line LS2. Similarly, the segment electrodes ES2, ES3, ES4, ES5, ES6, and ES7 are coupled to the segment terminals TS3, TS7, TS9, TS11, TS13, and TS15 via the segment signal lines LS3, LS7, LS9, LS11, LS13, and LS15, and coupled to the segment terminals TS4, TS8, TS10, TS12, TS14, and TS16 via the segment signal lines LS4, LS8, LS10, LS12, LS14, and LS16, respectively. The segment terminals TS17 and TS18 are coupled by the segment signal line LS17. In the example in FIG. 2, the segment terminals TS5, TS6, TS19, and TS20 are so-called NC terminals. NC is an abbreviation of non-connection.

The segment electrodes ES1 to ES7 and the segment signal lines LS1 to LS17 are transparent electrodes provided on the glass substrate. Of the transparent electrode, a portion facing a common electrode across the liquid crystal is a segment electrode, and a portion coupling the segment electrode to a segment terminal is a segment signal line. For example, the segment electrode ES1 and the segment signal lines LS1 and LS2 are formed of an integrated transparent electrode. Of this, a portion facing a common electrode EC1 in FIG. 3 to be described later is the segment electrode ES1. The segment electrodes ES1 to ES7 each have a predetermined icon shape. When the segment drive circuit 150 drives the segment electrodes ES1 to ES7 based on the display data, each icon is controlled to be displayed or not to be displayed. FIG. 2 shows an example in which numbers 0 to 9 are expressed by a combination of the segment electrodes ES1 to ES7.

FIG. 2 shows an example in which a segment signal line LS17 not coupled to a segment electrode is provided dedicated to resistance monitoring. However, since the transparent electrode for display can also be used for resistance monitoring in the embodiment as described later, the segment signal line LS17 dedicated to resistance monitoring may be omitted.

Figure 3:
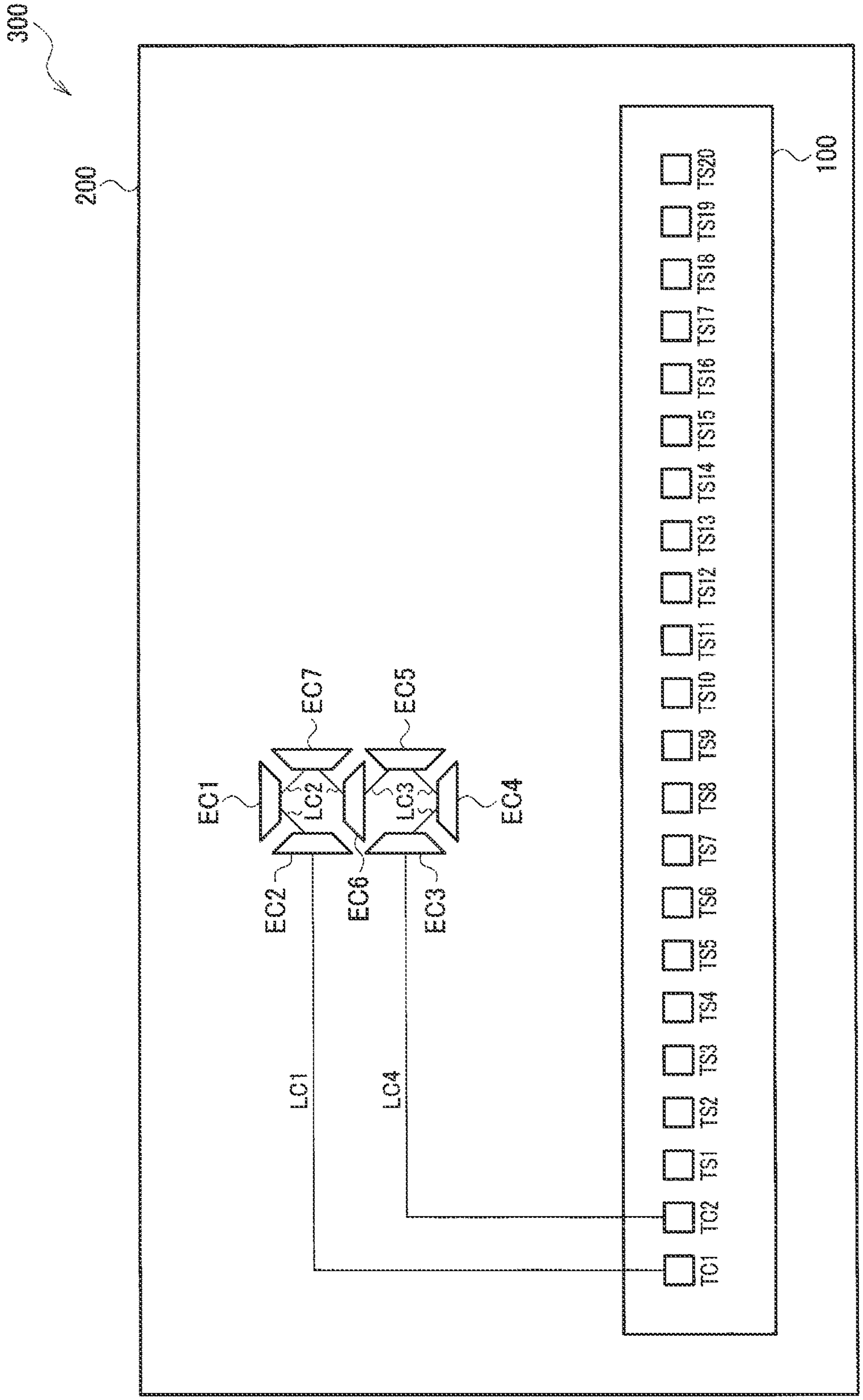
FIG. 3 shows an example of common transparent electrodes of the electro-optical panel in the first configuration example and an example of coupling between the common transparent electrode and the driver.

FIG. 3 shows an example of common transparent electrodes of the electro-optical panel in the first configuration example and an example of coupling between the common transparent electrodes and the driver. The electro-optical panel 200 includes common electrodes EC1 to EC7 and common signal lines LC1 to LC4. The driver 100 includes common terminals TC1 and TC2.

The common terminals TC1 and TC2 are pads formed on the semiconductor substrate of the driver 100. The common terminals TC1 and TC2 are respectively coupled to the common signal lines LC1 and LC4 via, for example, metal bumps. FIG. 3 also shows the common terminals and the like that are originally hidden by the semiconductor substrate and cannot be seen.

The common electrode EC2 is coupled to the common terminal TC1 via the common signal line LC1. The common electrodes EC2, EC1, EC7, and EC6 are coupled in series to the common signal line LC2. The common electrodes EC6, EC5, EC4, and EC3 are coupled in series to the common signal line LC3. The common electrode EC3 is coupled to the common terminal TC2 via the common signal line LC4.

The common electrodes EC1 to EC7 and the common signal lines LC1 to LC4 are transparent electrodes provided on the glass substrate. Of the transparent electrode, a portion facing a segment electrode across the liquid crystal is a common electrode, and a portion coupling the common electrode to a common electrode or coupling between common electrodes is a common signal line. Shapes of the common electrodes EC1 to EC7 are the same as icon shapes of the segment electrodes ES1 to ES7 facing the common electrodes EC1 to EC7. The common drive circuit 170 drives the common electrodes EC1 to EC7 based on a polarity signal from the control circuit 120.

Figure 4:
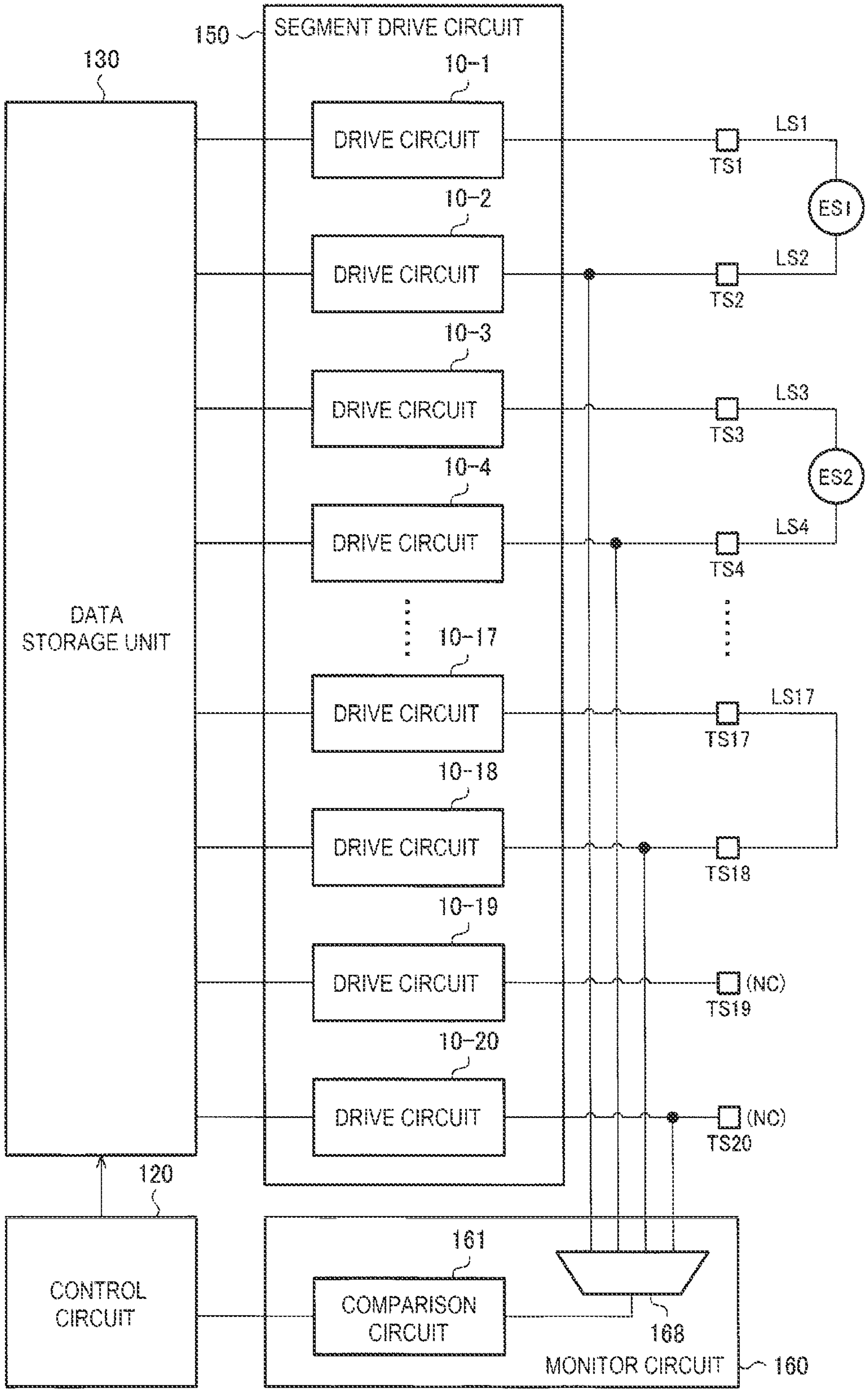
FIG. 4 shows a configuration example of a segment drive circuit and a monitor circuit in the first configuration example.

FIG. 4 shows a configuration example of the segment drive circuit and the monitor circuit in the first configuration example. In FIG. 4, the line latch 140 is not shown.

The segment drive circuit 150 includes drive circuits 10-1 to 10-20 provided corresponding to the segment terminals TS1 to TS20.

Outputs of the drive circuits 10-1 to 10-20 are coupled to the segment terminals TS1 to TS20. The outputs of the drive circuits 10-2, 10-4, . . . , 10-20 are coupled to the segment terminals TS2, TS4, . . . , TS20 via a switch SB to be described later with reference to FIG. 5, but the switch SB is not shown in FIG. 4.

The monitor circuit 160 includes a comparison circuit 161 and a selector 168. Here, a voltage generation circuit 165 to be described later is not shown in FIG. 5.

The selector 168 selects one of the segment terminals TS2, TS4, . . . . TS20, and couples the selected segment terminal to an input of the comparison circuit 161. The selector 168 corresponds to a switch SA to be described later with reference to FIG. 5. Any one or more segment terminals among the segment terminals TS2, TS4, . . . , TS20 can be set as a monitoring target. When a plurality of segment terminals are to be monitored, the selector 168 selects the plurality of segment terminals to be monitored in a time-division manner.

The comparison circuit 161 compares a voltage of the segment terminal selected by the selector 168 with a comparison determination voltage, and outputs the result to the control circuit 120.

Although FIG. 4 shows an example in which one comparison circuit is provided for the segment drive circuit 150, one comparison circuit may be provided for each drive circuit, or the drive circuits 10-1 to 10-20 may be divided into a plurality of groups, and a selector and a comparison circuit may be provided for each group.

Figure 5:
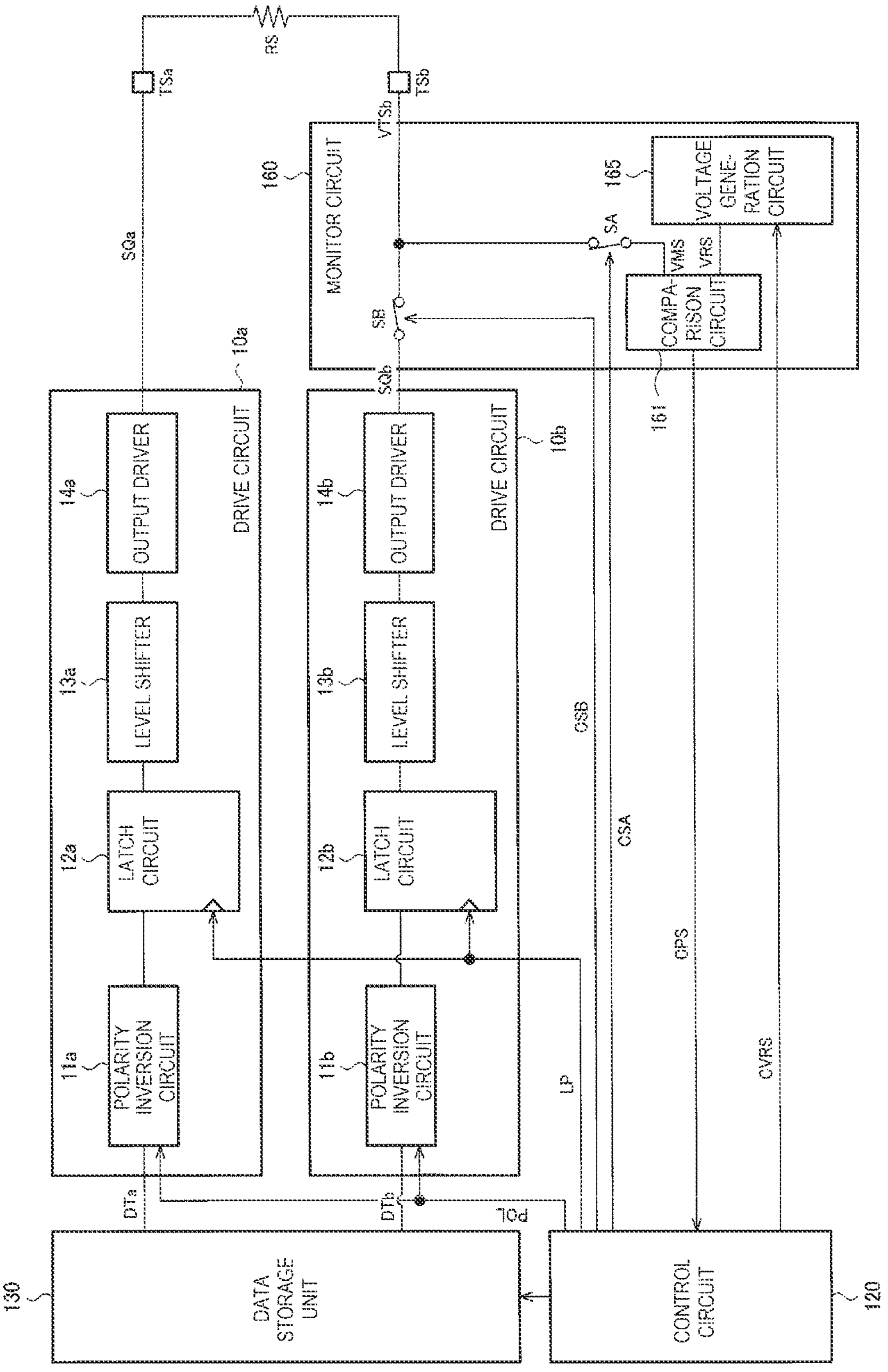
FIG. 5 shows a detailed configuration example of the segment drive circuit and the monitor circuit in the first configuration example.

FIG. 5 shows a detailed configuration example of the segment drive circuit and the monitor circuit in the first configuration example. In FIG. 5, the line latch 140 is not shown.

The segment terminals TSa and TSb are any two terminals coupled by the transparent electrodes of the electro-optical panel 200 in FIG. 2. The drive circuits 10*a* and 10*b* are drive circuits provided corresponding to the segment terminals TSa and TSb. For example, when the segment terminals TSa and TSb correspond to the segment terminals TS1 and TS2 in FIG. 2, the drive circuits 10*a* and 10*b* correspond to the drive circuits 10-1 and 10-2 in FIG. 4.

The drive circuit 10*a* includes a polarity inversion circuit 11*a*, a latch circuit 12*a*, a level shifter 13*a*, and an output driver 14*a*.

The polarity inversion circuit 11*a* inverts polarity of drive data DTa based on a polarity signal POL from the control circuit 120. The drive data DTa is the display data or the first data for resistance monitoring. The polarity inversion circuit 11*a* outputs a signal having the same logic level as the drive data DTa in a positive polarity frame, and outputs a signal obtained by inverting a logic level of the drive data DTa in a negative polarity frame.

The latch circuit 12*a* latches the output signal of the polarity inversion circuit 11*a* using a latch pulse LP from the control circuit 120, and outputs the latched signal.

The level shifter 13*a* level-shifts the output signal of the latch circuit 12*a*. The polarity inversion circuit 11*a* and the latch circuit 12*a* operate at a logic power supply voltage, and the output driver 14*a* operates at a driving power supply voltage higher than the logic power supply voltage. The level shifter 13*a* level-shifts a signal level of the logic power supply voltage to a signal level of the driving power supply voltage.

The output driver 14*a* buffers an output signal of the level shifter 13*a* and outputs, to the segment terminal TSa, the buffered signal as a signal SQa. When the drive data DTa is the display data, the signal SQa is a display segment drive signal, and when the drive data DTa is the first data, the signal SQa is the first voltage for resistance monitoring.

The drive circuit 10*b* includes a polarity inversion circuit 11*b*, a latch circuit 12*b*, a level shifter 13*b*, and an output driver 14*b*. Since a configuration and an operation thereof are similar to those of the drive circuit 10*a*, only an outline thereof will be described below.

The polarity inversion circuit 11*b* inverts polarity of drive data DTb based on the polarity signal POL. The drive data DTb is the display data or the second data for resistance monitoring. The latch circuit 12*b* latches an output signal of the polarity inversion circuit 11*b* using the latch pulse LP from the control circuit 120. The level shifter 13*b* level-shifts an output signal of the latch circuit 12*b*. The output driver 14*b* buffers an output signal of the level shifter 13*b* and outputs the buffered signal as a signal SQb. When the drive data DTb is the display data, the signal SQb is a display segment drive signal, and when the drive data DTb is the second data, the signal SQb is the second voltage for resistance monitoring.

The monitor circuit 160 includes switches SA and SB, a comparison circuit 161, and a voltage generation circuit 165.

The voltage generation circuit 165 generates a comparison determination voltage VRS of a voltage value indicated by a control signal CVRS from the control circuit 120, and outputs the comparison determination voltage VRS to a first input terminal of the comparison circuit 161. The voltage generation circuit 165 includes, for example, a ladder resistor and a switch circuit that selects one of a plurality of voltages generated by the ladder resistor based on the control signal CVRS. The voltage selected by the switch circuit is output as the comparison determination voltage VRS.

The switch SA is provided between the segment terminal TSb and a second input terminal of the comparison circuit 161. That is, one end of the switch SA is coupled to the segment terminal TSb, and the other end thereof is coupled to the second input terminal. The switch SA is controlled to be turned on or off by a control signal CSA from the control circuit 120. The switch SB is provided between the segment terminal TSb and an output of the output driver 14*b*. That is, one end of the switch SB is coupled to the segment terminal TSb, and the other end thereof is coupled to the output of the output driver 14*b*. The switch SB is controlled to be turned on or off by a control signal CSB from the control circuit 120. Each of the switches SA and SB includes, for example, one or more transistors.

When the switch SA is turned on, a voltage VTSb of the segment terminal TSb is input to the second input terminal of the comparison circuit 161 as a monitoring voltage VMS. The comparison determination voltage VRS from the voltage generation circuit 165 is input to the first input terminal of the comparison circuit 161. The first input terminal is one of a non-inverting input terminal and an inverting input terminal, and the second input terminal is the other of the non-inverting input terminal and the inverting input terminal. The comparison circuit 161 compares the monitoring voltage VMS with the comparison determination voltage VRS, and outputs, to the control circuit 120, the result as a signal CPS. A parasitic resistance of the transparent electrode coupled between the segment terminals TSa and TSb is denoted by RS. The signal CPS is a signal indicating whether a resistance value of the resistor RS is abnormal. An abnormality in the resistance value means that a resistance value of the transparent electrode is higher than a predetermined resistance value due to aging or the like of the electro-optical panel 200. The predetermined resistance value is set by the comparison determination voltage VRS.

Figures 6, 7:
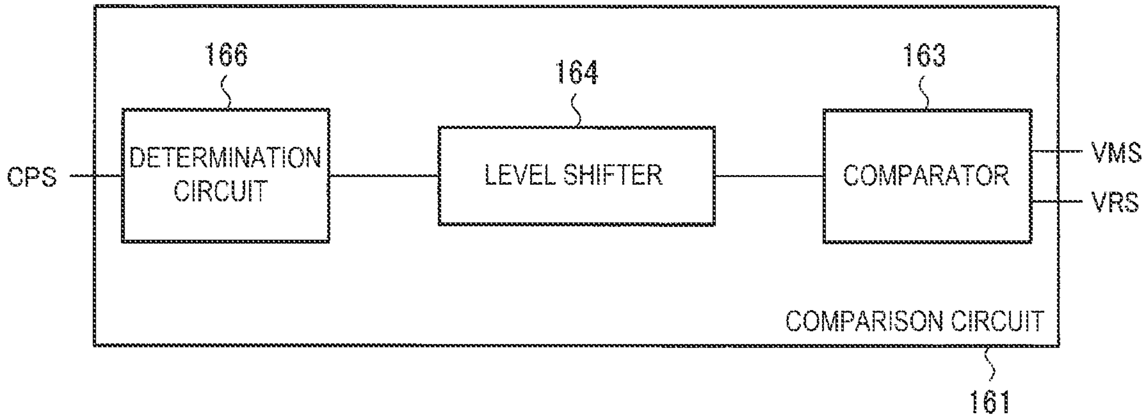
FIG. 6 shows a detailed configuration example of a comparison circuit.
FIG. 7 shows an explanatory diagram of operations of the drive circuit and the monitor circuit in the first configuration example.

FIG. 6 shows a detailed configuration example of the comparison circuit. The comparison circuit 161 includes a comparator 163, a level shifter 164, and a determination circuit 166.

The comparator 163 operates at the driving power supply voltage, and compares the monitoring voltage VMS with the comparison determination voltage VRS.

The level shifter 164 level-shifts an output signal of the comparator 163. That is, the level shifter 164 level-shifts a signal level of the driving power supply voltage to a signal level of the logic power supply voltage.

The determination circuit 166 operates at the logic power supply voltage, and determines whether a resistance value of the resistor RS is abnormal based on an output signal of the level shifter 164. When the output signal of the comparator 163 satisfies a predetermined condition, the determination circuit 166 determines that the resistance value of the resistor RS is abnormal. For example, the determination circuit 166 determines that the resistance value of the resistor RS is abnormal when the output signal of the comparator 163 is at a logic level indicating an abnormality for a predetermined time or longer or a plurality of times.

FIG. 7 shows an explanatory diagram of operations of the drive circuit and the monitor circuit in the first configuration example. The drive circuits 10*a* and 10*b* and the monitor circuit 160 in FIG. 5 are set to a display state or a monitoring state.

For example, when the segment electrodes are driven as in the drive circuits 10-1 and 10-2 in FIG. 4, the display state alone may be set, or the display state may be set in a display period and the monitoring state may be set in a monitoring period. The monitoring period is, for example, when the driver 100 is started. When the electro-optical panel 200 is mounted on a vehicle, for example, the driver 100 may be started by turning on power at the time of starting an engine or a motor of the vehicle, and resistance monitoring may be executed at this time.

Alternatively, when the segment signal line dedicated to resistance monitoring is coupled as in the drive circuits 10-17 and 10-18 in FIG. 4, the display state may not be set, and the monitoring state may be set in the monitoring period. The monitoring period in this case is not limited to when the driver 100 is started. For example, when the segment electrode ES1 and the like in FIG. 4 are driven for display, resistance monitoring may be executed on the segment signal line LS17 dedicated to resistance monitoring.

The display state includes one-line driving and two-line driving. In the one-line driving, the switch SA is turned off, the switch SB is turned off, the drive data DTa is the display data, and the drive data DTb may be any data. That is, the one-line driving is a state in which the segment electrodes are driven only by the drive circuit 10*a* in FIG. 5. In the two-line driving, the switch SA is turned off, the switch SB is turned on, the drive data DTa is the display data, and the drive data DTb is equal to the drive data DTa. That is, the two-line driving is a state in which the segment electrodes are driven by the drive circuits 10*a* and 10*b* in FIG. 5.

The one-line driving and the two-line driving may be selected freely, or the one-line driving may be switched to the two-line driving when opening of the transparent electrode is detected. "Opening" is also referred to as disconnection. For example, an opening detection circuit (not shown) may compare a logic level of the drive data DTa and a logic level of a signal from the terminal TSb in the one-line driving, and determine that the transparent electrode is open when the logic levels are different. Alternatively, the switch SA may be turned on in the one-line driving, and the monitor circuit 160 may also be used for opening detection. At this time, the voltage generation circuit 165 may output the comparison determination voltage VRS for the opening detection.

In the monitoring state, the switch SA is turned on, the switch SB is turned on, the drive data DTa is the first data, and the drive data DTb is the second data. At this time, the drive circuit 10*a* outputs the signal SQa of the first voltage, and the drive circuit 10*b* outputs the signal SQb of the second voltage. Specifically, the first data and the second data are data for setting output signals of the drive circuits 10*a* and 10*b* to (SQa, SQb)=(H, L), (L, H), or (H, H). L means a low level, that is, a low-potential-side power supply voltage of the output driver. H means a high level, that is, a high-potential-side power supply voltage of the output driver. For example, when (SQa, SQb)=(H, L), the first voltage is the high-potential-side power supply voltage, and the second voltage is the low-potential-side power supply voltage.

Figure 8:
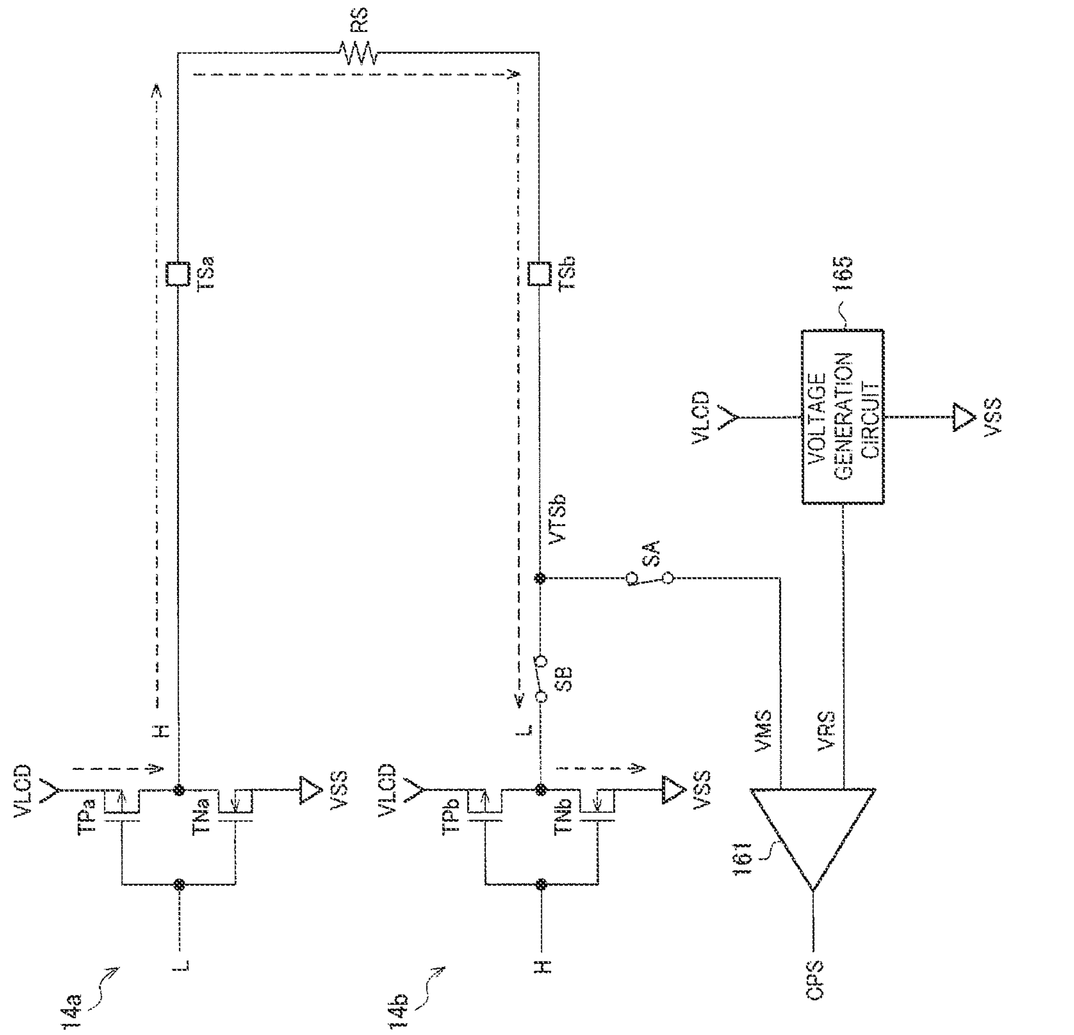
FIG. 8 shows a first example of a monitoring state.

FIG. 8 shows a first example of the monitoring state. FIG. 8 shows an example when (SQa, SQb)=(H, L).

The output driver 14*a* includes a P-type first transistor TPa provided between a node of a high-potential-side power supply voltage VLCD and the segment terminal TSa, and an N-type second transistor TNa provided between the segment terminal TSa and a node of a low-potential-side power supply voltage VSS. The low-potential-side power supply voltage is, for example, a ground voltage, and may be a voltage lower than the high-potential-side power supply voltage. The output driver 14*b* includes a P-type third transistor TPb provided between a node of the high-potential-side power supply voltage VLCD and the segment terminal TSb, and an N-type fourth transistor TNb provided between the segment terminal TSb and a node of the low-potential-side power supply voltage VSS. The high-potential-side power supply voltage VLCD and the low-potential-side power supply voltage VSS may be supplied from, for example, a power supply circuit (not shown) in the driver 100, or may be supplied from the outside of the driver 100.

In this example, when the first transistor TPa of the output driver 14*a* is turned on, the output driver 14*a* outputs the high-potential-side power supply voltage VLCD. When the fourth transistor TNb of the output driver 14*b* is turned on, the output driver 14*b* outputs the low-potential-side power supply voltage VSS. At this time, a current flows through a path indicated by a dotted arrow in FIG. 8, and thus an on-resistance of the first transistor TPa, the resistor RS of the transparent electrode, and an on-resistance of the fourth transistor TNb divide a voltage between the high-potential-side power supply voltage VLCD and the low-potential-side power supply voltage VSS. As a result, the voltage VTSb of the segment terminal TSb is determined.

The voltage generation circuit 165 divides the voltage between the high-potential-side power supply voltage VLCD and the low-potential-side power supply voltage VSS by the ladder resistor to generate the comparison determination voltage VRS. The comparison circuit 161 compares the monitoring voltage VMS, which is the voltage VTSb of the segment terminal TSb, with the comparison determination voltage VRS. The output signal CPS of the comparison circuit 161 is one of a high level and a low level when VTSb>VRS, and is the other of the high level and the low level when VTSb<VRS. Since the resistor RS of the transparent electrode gradually increases with aging, the voltage VTSb of the segment terminal TSb gradually decreases. That is, when VTSb<VRS, the electro-optical panel 200 is determined to be abnormal.

Figure 9:
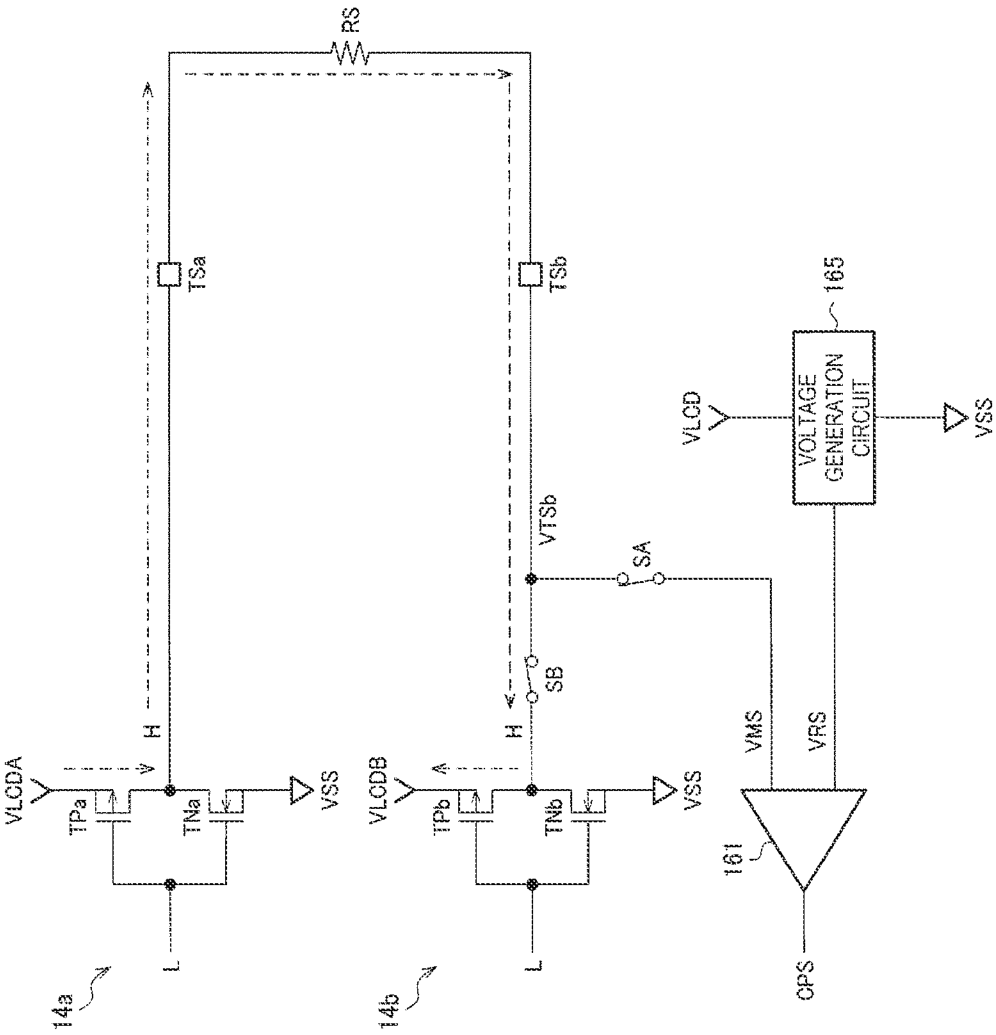
FIG. 9 shows a second example of the monitoring state.

FIG. 9 shows a second example of the monitoring state. FIG. 9 shows an example when (SQa, SQb)=(H, H).

The output driver 14*a* includes the P-type first transistor TPa provided between a node of a first high-potential-side power supply voltage VLCDA and the segment terminal TSa, and the N-type second transistor TNa provided between the segment terminal TSa and a node of the low-potential-side power supply voltage VSS. The output driver 14*b* includes the P-type third transistor TPb provided between a node of a second high-potential-side power supply voltage VLCDB and the segment terminal TSb, and the N-type fourth transistor TNb provided between the segment terminal TSb and a node of the low-potential-side power supply voltage VSS. A voltage value of the second high-potential-side power supply voltage VLCDB may be different from a voltage value of the first high-potential-side power supply voltage VLCDA, and may be higher or lower than the voltage value of the first high-potential-side power supply voltage VLCDA. FIG. 9 shows an example in which the voltage value of the second high-potential-side power supply voltage VLCDB is lower than the voltage value of the first high-potential-side power supply voltage VLCDA. The first high-potential-side power supply voltage VLCDA, the second high-potential-side power supply voltage VLCDB, and the low-potential-side power supply voltage VSS may be supplied from, for example, a power supply circuit (not shown) in the driver 100, or may be supplied from the outside of the driver 100.

In this example, when the first transistor TPa of the output driver 14*a* is turned on, the output driver 14*a* outputs the first high-potential-side power supply voltage VLCDA. When the third transistor TPb of the output driver 14*b* is turned on, the output driver 14*b* outputs the second high-potential-side power supply voltage VLCDB. At this time, a current flows through a path indicated by a dotted arrow in FIG. 9, and thus an on-resistance of the first transistor TPa, the resistor RS of the transparent electrode, and an on-resistance of the third transistor TPb divide a voltage between the first high-potential-side power supply voltage VLCDA and the second high-potential-side power supply voltage VLCDB. As a result, the voltage VTSb of the segment terminal TSb is determined.

Operations of the voltage generation circuit 165 and the comparison circuit 161 are the same as those in the first example in FIG. 8. However, a voltage value of the comparison determination voltage VRS in the second example may be different from a voltage value of the comparison determination voltage VRS in the first example.

Figure 10:
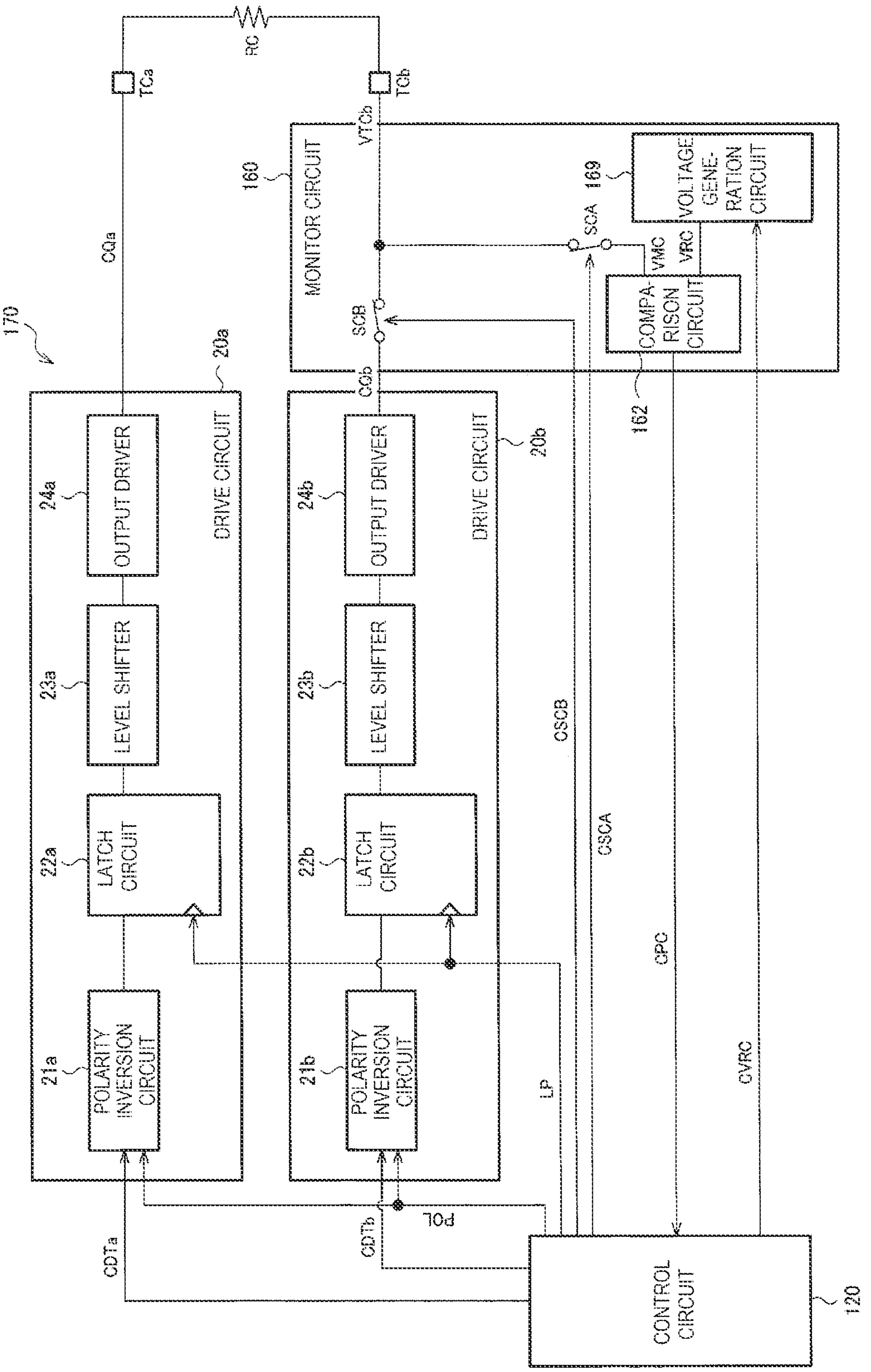
FIG. 10 shows a detailed configuration example of a common drive circuit and the monitor circuit.

FIG. 10 shows a detailed configuration example of the common drive circuit and the monitor circuit. The common drive circuit 170 includes a drive circuit 20*a* and a drive circuit 20*b*. Common terminals TCa and TCb correspond to, for example, the common terminals TC1 and TC2 in FIG. 2.

The drive circuit 20*a* includes a polarity inversion circuit 21*a*, a latch circuit 22*a*, a level shifter 23*a*, and an output driver 24*a*. The drive circuit 20*b* includes a polarity inversion circuit 21*b*, a latch circuit 22*b*, a level shifter 23*b*, and an output driver 24*b*.

The polarity inversion circuit 21*a* inverts polarity of common data CDTa from the control circuit 120 based on the polarity signal POL from the control circuit 120. The polarity inversion circuit 21*b* inverts polarity of common data CDTb from the control circuit 120 based on the polarity signal POL from the control circuit 120. In the display state, (CDTa, CDTb)=(H, H). In the monitoring state, the common data CDTa is the first data, and the common data CDTb is the second data. That is, (CDTa, CDTb)=(H, L), (L, H), or (H, H).

Operations of the latch circuits 22*a* and 22*b* and the level shifters 23*a* and 23*b* are the same as operations of the latch circuits 12*a* and 12*b* and the level shifters 13*a* and 13*b* in FIG. 5.

The output driver 24*a* buffers an output signal of the level shifter 23*a* and outputs, to the common terminal TCa, the buffered signal as a signal CQa. In the display state, the signal CQa is a display common drive signal, and in the monitoring state, the signal Coa is the first voltage for resistance monitoring. The output driver 24*b* buffers an output signal of the level shifter 23*b* and outputs, to the common terminal TCb, the buffered signal as a signal CQb. In the display state, the signal Cob is a display common drive signal, and in the monitoring state, the signal CQb is the second voltage for resistance monitoring.

The monitor circuit 160 includes switches SCA and SCB, a comparison circuit 162, and a voltage generation circuit 169.

The voltage generation circuit 169 generates a comparison determination voltage VRC of a voltage value indicated by a control signal CVRC from the control circuit 120, and outputs the comparison determination voltage VRC to a first input terminal of the comparison circuit 162. The voltage generation circuit 169 includes, for example, a ladder resistor and a switch circuit that selects one of a plurality of voltages generated by the ladder resistor based on the control signal CVRC. The voltage selected by the switch circuit is output as the comparison determination voltage VRC.

The switch SCA is provided between the common terminal TCb and the second input terminal of the comparison circuit 162. That is, one end of the switch SCA is coupled to the common terminal TCb, and the other end thereof is coupled to the second input terminal. The switch SCA is controlled to be turned on or off by a control signal CSCA from the control circuit 120. The switch SCB is provided between the common terminal TCb and an output of the output driver 24*b*. That is, one end of the switch SCB is coupled to the common terminal TCb, and the other end thereof is coupled to the output of the output driver 24*b*. The switch SCB is controlled to be turned on or off by a control signal CSCB from the control circuit 120. Each of the switches SCA and SCB includes, for example, one or more transistors.

When the switch SCA is turned on, a voltage VTCb of the common terminal TCb is input to the second input terminal of the comparison circuit 162 as a monitoring voltage VMC. The comparison determination voltage VRC from the voltage generation circuit 169 is input to the first input terminal of the comparison circuit 162. The first input terminal is one of a non-inverting input terminal and an inverting input terminal, and the second input terminal is the other of the non-inverting input terminal and the inverting input terminal. The comparison circuit 162 compares the monitoring voltage VMC with the comparison determination voltage VRC, and outputs, to the control circuit 120, the result as a signal CPC. A parasitic resistance of the transparent electrode coupled between the common terminals TCa and TCb is denoted by RC. The signal CPC is a signal indicating whether a resistance value of the resistor RC is abnormal. A detailed configuration example of the comparison circuit 161 is the same as that in FIG. 6. A resistance monitoring method is the same as a method shown in FIG. 8 or FIG. 9.

FIG. 10 shows an example in which the voltage generation circuit 169 and the comparison circuit 162 used for common resistance monitoring are provided separately from the voltage generation circuit 165 and the comparison circuit 161 used for segment resistance monitoring. However, the voltage generation circuit or the comparison circuit may be shared between the segment and the common. When the comparison circuit is shared, the segment resistance monitoring and the common resistance monitoring are executed in a time-division manner.

In the embodiment described above, the driver 100 includes a first terminal, a second terminal, a first drive circuit, a second drive circuit, and the monitor circuit 160.

The second terminal is coupled to the first terminal via a transparent electrode provided at the electro-optical panel 200. The first drive circuit is coupled to the first terminal and drives the first terminal. The second drive circuit is coupled to the second terminal and drives the second terminal. The monitor circuit 160 detects a resistance value of the transparent electrode based on a voltage of the second terminal in a monitoring state. The monitoring state is a state in which the first terminal is coupled to the first high-potential-side power supply voltage VLCDA via the first drive circuit, and the second terminal is coupled to the second high-potential-side power supply voltage VLCDB different from the first high-potential-side power supply voltage VLCDA via the second drive circuit. Alternatively, the monitoring state is a state in which the first terminal is coupled to one of the high-potential-side power supply voltage VLCD and the low-potential-side power supply voltage VSS via the first drive circuit, and the second terminal is coupled to the other of the high-potential-side power supply voltage VLCD and the low-potential-side power supply voltage VSS via the second drive circuit. The monitoring state can also be referred to as a state in which the first drive circuit outputs a first voltage and the second drive circuit outputs a second voltage different from the first voltage.

For example, in FIG. 5, the segment terminal TSa is the first terminal, the segment terminal TSb is the second terminal, the drive circuit 10*a* is the first drive circuit, and the drive circuit 10*b* is the second drive circuit. In the monitoring state in FIG. 8, the first terminal is coupled to the high-potential-side power supply voltage VLCD, and the second terminal is coupled to the low-potential-side power supply voltage VSS. The first terminal may be coupled to the low-potential-side power supply voltage VSS, and the second terminal may be coupled to the high-potential-side power supply voltage VLCD. In the monitoring state in FIG. 9, the first terminal is coupled to the first high-potential-side power supply voltage VLCDA, and the second terminal is coupled to the second high-potential-side power supply voltage VLCDB. Alternatively, in FIG. 10, the common terminal TCa is the first terminal, the common terminal TCb is the second terminal, the drive circuit 20*a* is the first drive circuit, and the drive circuit 20*b* is the second drive circuit. Alternatively, in FIG. 13 to be described later, a segment terminal TSa1 is the first terminal, a segment terminal TSb2 is the second terminal, a drive circuit 30*a* is the first drive circuit, and a drive circuit 30*b* is the second drive circuit. Alternatively, in FIG. 15 to be described later, the segment terminal TSa1 is the first terminal, the segment terminal TSb1 is the second terminal, the drive circuit 30*a* is the first drive circuit, and the drive circuit 30*b* is the second drive circuit.

According to the embodiment, a resistance value of the transparent electrode coupled between the first terminal and the second terminal can be detected. In JP-A-2020-085476, a bump bonding abnormality in COG mounting is detected, but in the embodiment, it is possible to monitor aging of the electro-optical panel 200 by detecting the resistance value of the transparent electrode. In the embodiment, the first drive circuit and the second drive circuit that can be used for display can also be used for resistance monitoring of the transparent electrode. That is, when the first terminal and the second terminal are coupled to different voltages in the monitoring state, a current flows through the transparent electrode due to a voltage difference, and the resistance value of the transparent electrode can be detected based on a voltage of the second terminal, which is the divided voltage. Accordingly, it is not necessary to provide a bump dedicated to evaluation as disclosed in JP-A-2020-085476.

In the embodiment, the monitor circuit 160 includes a comparison circuit and a first switch. A comparison determination voltage is input to a first input terminal of the comparison circuit. The first switch is provided between the second terminal and a second input terminal of the comparison circuit, and is turned on in the monitoring state.

Figure 15:
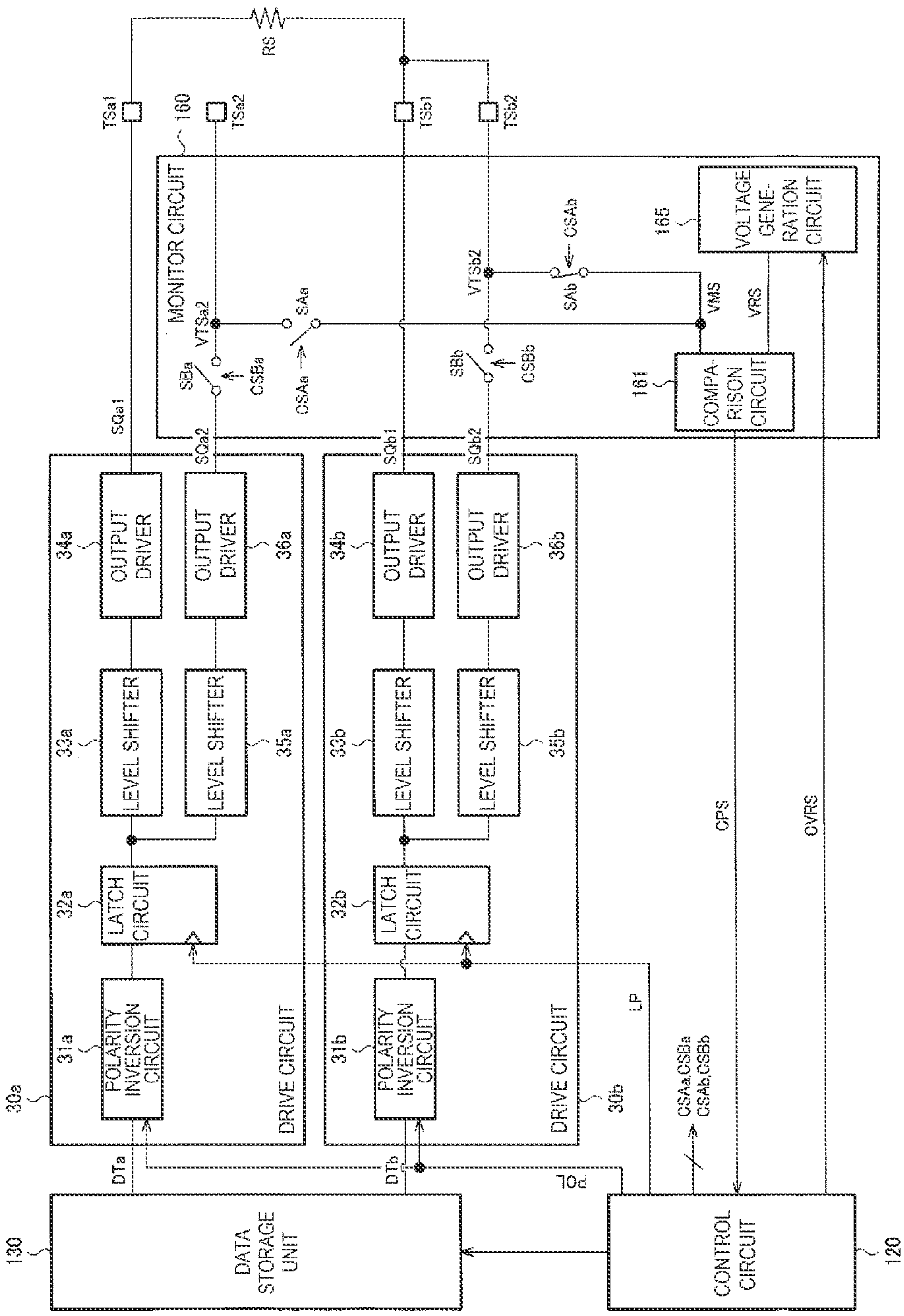
FIG. 15 shows a detailed configuration example of the segment drive circuit and the monitor circuit in the second configuration example and a second coupling example of the transparent electrode.

For example, in FIG. 5, the segment terminal TSb is the second terminal, and the monitor circuit 160 includes the comparison circuit 161 and the switch SA corresponding to the first switch. Alternatively, in FIG. 10, the common terminal TCb is the second terminal, and the monitor circuit 160 includes the comparison circuit 162 and the switch SCA corresponding to the first switch. Alternatively, in FIG. 13 to be described later, the segment terminal TSb2 is the second terminal, and the monitor circuit 160 includes the comparison circuit 161 and a switch SAb corresponding to the first switch. Alternatively, in FIG. 15 to be described later, the segment terminal TSb1 is the second terminal, and the monitor circuit 160 includes the comparison circuit 161 and the switch SAb corresponding to the first switch. In FIG. 15, the switch SAb is coupled to the segment terminal TSb1 as the second terminal via the segment terminal TSb2 and the transparent electrode.

According to the embodiment, when the first switch provided between the second terminal and the second input terminal of the comparison circuit is turned on in the monitoring state, a voltage of the second terminal is input to the second input terminal of the comparison circuit in the monitoring state. Accordingly, in the monitoring state, the comparison circuit can compare the voltage of the second terminal with the comparison determination voltage.

In the embodiment, the monitor circuit includes a second switch. The second switch is provided between the second terminal and an output of the second drive circuit, and is turned on in the monitoring state.

For example, in FIG. 5, the segment terminal TSb is the second terminal, and the monitor circuit 160 includes the switch SB corresponding to the second switch. Alternatively, in FIG. 10, the common terminal TCb is the second terminal, and the monitor circuit 160 includes the switch SCB corresponding to the second switch. Alternatively, in FIG. 13 to be described later, the segment terminal TSb2 is the second terminal, and the monitor circuit 160 includes a switch SBb corresponding to the second switch.

According to the embodiment, when the second switch provided between the second terminal and the output of the second drive circuit is turned on in the monitoring state, the second terminal is coupled to a second high-potential-side power supply voltage or is coupled to the other of a high-potential-side power supply voltage and a low-potential-side power supply voltage via the second drive circuit in the monitoring state. Accordingly, in the monitoring state, the first terminal to which one end of the transparent electrode is coupled and the second terminal to which the other end of the transparent electrode is coupled are coupled to different voltages.

In the embodiment, the second switch is turned off when a display electrode provided in the transparent electrode is driven for display by the first drive circuit.

For example, in FIGS. 5 and 7, the display electrode is a segment electrode, and when the drive circuit 10*a* corresponding to the first drive circuit drives the segment electrode by one line, the switch SB corresponding to the second switch is turned off. Alternatively, in FIG. 10, the display electrode is a common electrode, and when the drive circuit

20*a* corresponding to the first drive circuit drives the common electrode by one line, the switch SCB corresponding to the second switch is turned off. Alternatively, in FIGS. 13 and 14, the display electrode is a segment electrode, and when the drive circuit 30*a* corresponding to the first drive circuit drives the segment electrode by one line, the switch SBb corresponding to the second switch is turned off.

According to the embodiment, by switching on and off the second switch, it is possible to switch between one-line driving of a display state in which the display electrode is driven for display and the monitoring state in which the resistance value of the transparent electrode is detected. However, as shown in FIG. 7 and the like, it is also possible to execute two-line driving in which the second switch is turned on in the display state.

In the embodiment, the second switch is turned on when opening between the first terminal and the second terminal is detected.

For example, in FIGS. 5 and 7, when opening between the segment terminal TSa and the segment terminal TSb is detected in one-line driving, two-line driving is executed, and the switch SB corresponding to the second switch is turned on. Alternatively, in FIG. 10, when opening between the common terminal TCa and the common terminal TCb is detected in one-line driving, two-line driving is executed, and the switch SCB corresponding to the second switch is turned on. Alternatively, in FIGS. 13 and 14, when opening between the segment terminal TSa1 and the segment terminal TSb2 is detected in one-line driving, two-line driving is executed, and the switch SBb corresponding to the second switch is turned on.

According to the embodiment, the second switch is turned on when the opening between the first terminal and the second terminal is detected in the one-line driving in which the second switch is turned off and the first drive circuit drives the display electrode for display. Accordingly, since the first drive circuit and the second drive circuit are switched to two-line driving in which the display electrode is driven for display, the display electrode is driven for display even when the first terminal and the display electrode or the second terminal and the display electrode are open.

In the embodiment, the monitor circuit 160 includes a voltage generation circuit that generates a comparison determination voltage and a comparison circuit that compares the comparison determination voltage with a voltage of the second terminal.

For example, in FIG. 5, the monitor circuit 160 includes the voltage generation circuit 165 that generates the comparison determination voltage VRS, and the comparison circuit 161 that compares the comparison determination voltage VRS with the voltage VTSb of the segment terminal TSb. Alternatively, in FIG. 10, the monitor circuit 160 includes the voltage generation circuit 169 that generates the comparison determination voltage VRC, and the comparison circuit 162 that compares the comparison determination voltage VRC with the voltage VTCb of the common terminal TCb. Alternatively, in FIG. 13, the monitor circuit 160 includes the voltage generation circuit 165 that generates the comparison determination voltage VRS, and the comparison circuit 161 that compares the comparison determination voltage VRS with the voltage VTSb2 of the segment terminal TSb2. Alternatively, in FIG. 15, the monitor circuit 160 includes the voltage generation circuit 165 that generates the comparison determination voltage VRS, and the comparison circuit 161 that compares the comparison determination voltage VRS with the voltage VTSb2 of the segment terminal TSb2. In FIG. 15, the segment terminal TSb2 is coupled to the segment terminal TSb1 corresponding to the second terminal and the transparent electrode, and the voltage VTSb2 is the voltage of the second terminal.

According to the embodiment, the comparison circuit compares the comparison determination voltage generated by the voltage generation circuit with the voltage of the second terminal, whereby the monitor circuit can detect the resistance value of the transparent electrode based on the voltage of the second terminal in the monitoring state.

In the embodiment, the driver 100 includes the storage circuit 180 in which a voltage value of the comparison determination voltage is set.

The voltage value of the comparison determination voltage serves as a reference for determining whether the electro-optical panel 200 is abnormal. According to the embodiment, the voltage value of the comparison determination voltage generated by the voltage generation circuit can be set in a storage circuit. Accordingly, it is possible to set, in the storage circuit 180, a reference for determining whether the electro-optical panel 200 is abnormal when the resistance value of the transparent electrode is reached.

In the embodiment, as shown in FIG. 9, the first drive circuit includes the first transistor TPa provided between a node of the first high-potential-side power supply voltage VLCDA and the first terminal, and the second transistor TNa provided between the first terminal and a node of the low-potential-side power supply voltage VSS. The second drive circuit includes the third transistor TPb provided between a node of the second high-potential-side power supply voltage VLCDB and the second terminal, and the fourth transistor TNb provided between the second terminal and a node of the low-potential-side power supply voltage VSS. In the monitoring state in which the first terminal is coupled to the first high-potential-side power supply voltage VLCDA via the first drive circuit and the second terminal is coupled to the second high-potential-side power supply voltage VLCDB via the second drive circuit, the first transistor TPa and the third transistor TPb are turned on, and the second transistor TNa and the fourth transistor TNb are turned off.

According to the embodiment, a current flows through a path of the first transistor TPa, the transparent electrode, and the third transistor TPb due to a voltage difference between the first high-potential-side power supply voltage VLCDA and the second high-potential-side power supply voltage VLCDB. Accordingly, an on-resistance of the first transistor TPa, the resistor RS of the transparent electrode, and an on-resistance of the third transistor TPb divide a voltage between the first high-potential-side power supply voltage VLCDA and the second high-potential-side power supply voltage VLCDB, and as a result, the voltage VTSb of the segment terminal TSb that is the second terminal is determined. Accordingly, the monitor circuit 160 can detect the resistance value of the transparent electrode.

In the embodiment, as shown in FIG. 8, the first drive circuit may include the first transistor TPa provided between a node of the high-potential-side power supply voltage VLCD and the first terminal, and the second transistor TNa provided between the first terminal and a node of the low-potential-side power supply voltage VSS. The second drive circuit may include the third transistor TPb provided between a node of the high-potential-side power supply voltage VLCD and the second terminal, and the fourth transistor TNb provided between the second terminal and a node of the low-potential-side power supply voltage VSS. In the monitoring state in which the first terminal is coupled to one of the high-potential-side power supply voltage VLCD and the low-potential-side power supply voltage VSS via the first drive circuit, and the second terminal is coupled to the other of the high-potential-side power supply voltage VLCD and the low-potential-side power supply voltage VSS via the second drive circuit, the first transistor TPa and the fourth transistor TNb may be turned to be one of on and off, and the second transistor TNa and the third transistor TPb may be turned to be the other of on and off. FIG. 8 shows an example in which the first transistor TPa and the fourth transistor TNb are turned on, and the second transistor TNa and the third transistor TPb are turned off.

According to the embodiment, a current flows through a path of the first transistor TPa, the transparent electrode, and the fourth transistor TNb due to a voltage difference between the first high-potential-side power supply voltage and the low-potential-side power supply voltage VSS. Accordingly, an on-resistance of the first transistor TPa, the resistor RS of the transparent electrode, and an on-resistance of the fourth transistor TNb divide a voltage between the high-potential-side power supply voltage VLCD and the low-potential-side power supply voltage VSS. Accordingly, the monitor circuit 160 can detect the resistance value of the transparent electrode. Alternatively, a current flows through a path of the second transistor TNa, the transparent electrode, and the third transistor TPb due to a voltage difference between the low-potential-side power supply voltage VSS and the first high-potential-side power supply voltage. Accordingly, an on-resistance of the second transistor TNa, the resistor RS of the transparent electrode, and an on-resistance of the third transistor TPb divide a voltage between the low-potential-side power supply voltage VSS and the high-potential-side power supply voltage VLCD. As a result, the voltage VTSb of the segment terminal TSb as the second terminal is determined. Accordingly, the monitor circuit 160 can detect the resistance value of the transparent electrode.

In the embodiment, the driver 100 includes the data storage unit 130. The data storage unit 130 stores display data, first data for setting a voltage coupled to the first terminal in the monitoring state, and second data for setting a voltage coupled to the second terminal in the monitoring state.

According to the embodiment, since the data storage unit 130 stores the first data and the second data, in the monitoring state, the first drive circuit can couple the first terminal to the first high-potential-side power supply voltage based on the first data, and the second drive circuit can couple the second terminal to the second high-potential-side power supply voltage based on the second data. Alternatively, in the monitoring state, the first drive circuit can couple the first terminal to one of the high-potential-side power supply voltage and the low-potential-side power supply voltage based on the first data, and the second drive circuit can couple the second terminal to the other of the high-potential-side power supply voltage and the low-potential-side power supply voltage based on the second data. Accordingly, the display state and the monitoring state can be switched by changing only the data without changing a configuration of display driving.

In the embodiment, the driver 100 includes the interface circuit 110. When an abnormality in the resistance value of the transparent electrode is detected, the interface circuit 110 notifies an external processing system of the abnormality.

According to the embodiment, the external processing system that receives a notification of the abnormality can execute processing corresponding to the abnormality. For example, the processing system can notify a user of information for notifying the abnormality in an electro-optical panel 200 or information for prompting replacement of the electro-optical panel 200.

3. Second Configuration Example

Hereinafter, a second configuration example will be described mainly on portions different from those of the first configuration example. A configuration related to the common is the same as that of the first configuration example, and thus the description thereof will be omitted.

Figure 11:
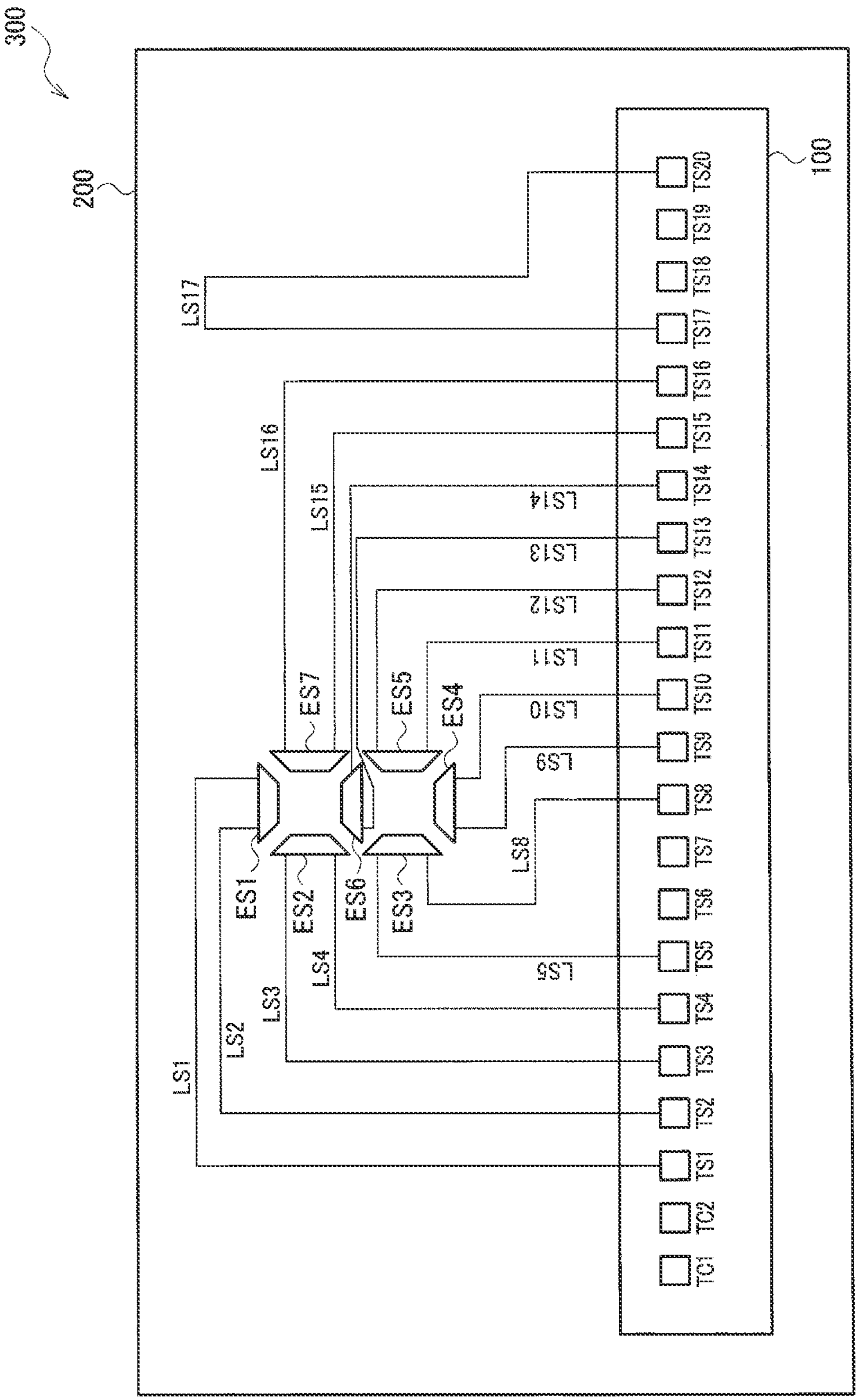
FIG. 11 shows an example of a segment transparent electrode of an electro-optical panel in a second configuration example, and an example of coupling between the segment transparent electrode and a driver.

FIG. 11 shows an example of a segment transparent electrode of an electro-optical panel in the second configuration example, and an example of coupling between the segment transparent electrode and a driver. The electro-optical panel 200 includes the segment electrodes ES1 to ES7 and the segment signal lines LS1 to LS5 and LS8 to LS17. The driver 100 includes segment terminals TS1 to TS20.

The segment electrode ES3 is coupled to a segment terminal TS5 via the segment signal line LS5, and is coupled to the segment terminal TS8 via the segment signal line LS8. The segment terminals TS17 and TS20 are coupled by the segment signal line LS17. In the example in FIG. 11, the segment terminals TS6, TS7, TS18, and TS19 are so-called NC terminals.

Figure 12:
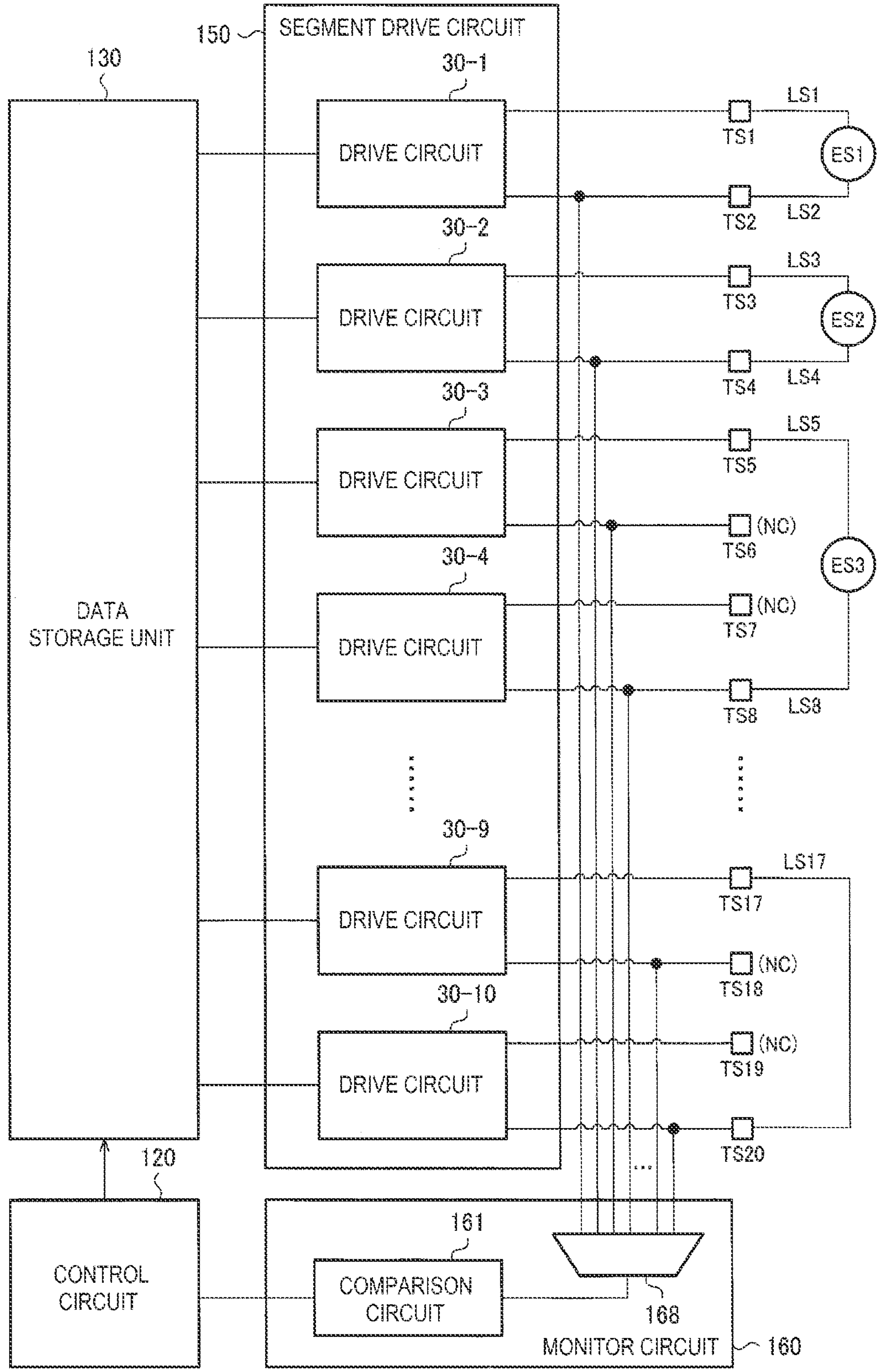
FIG. 12 shows a configuration example of a segment drive circuit and a monitor circuit in the second configuration example.

FIG. 12 shows a configuration example of a segment drive circuit and a monitor circuit in the second configuration example. In FIG. 12, the line latch 140 is not shown.

The segment drive circuit 150 includes a drive circuit 30-1 provided corresponding to the segment terminals TS1 and TS2. Similarly, the segment drive circuit 150 includes drive circuits 30-2, 30-3, . . . , 30-10 provided corresponding to the segment terminals TS3 and TS4, TS5 and TS6, . . . , TS19 and TS20.

A first output of the drive circuit 30-1 is coupled to the segment terminal TS1, and a second output thereof is coupled to the segment terminal TS2. Similarly, first outputs of the drive circuits 30-2, 30-3, . . . , 30-10 are coupled to the segment terminals TS3, TS5, . . . , TS19, and second outputs thereof are coupled to the segment terminals TS4, TS6, . . . , TS20. Second outputs of the drive circuits 30-1, 30-2, . . . , 30-10 are coupled to the segment terminals TS2, TS4, . . . , TS20 via switches SBa or SBb to be described later with reference to FIG. 13, but the switches SBa and SBb are not shown in FIG. 12.

The monitor circuit 160 includes a comparison circuit 161 and a selector 168. The selector 168 corresponds to switches SAa and SBb to be described later with reference to FIG. 13.

Figure 13:
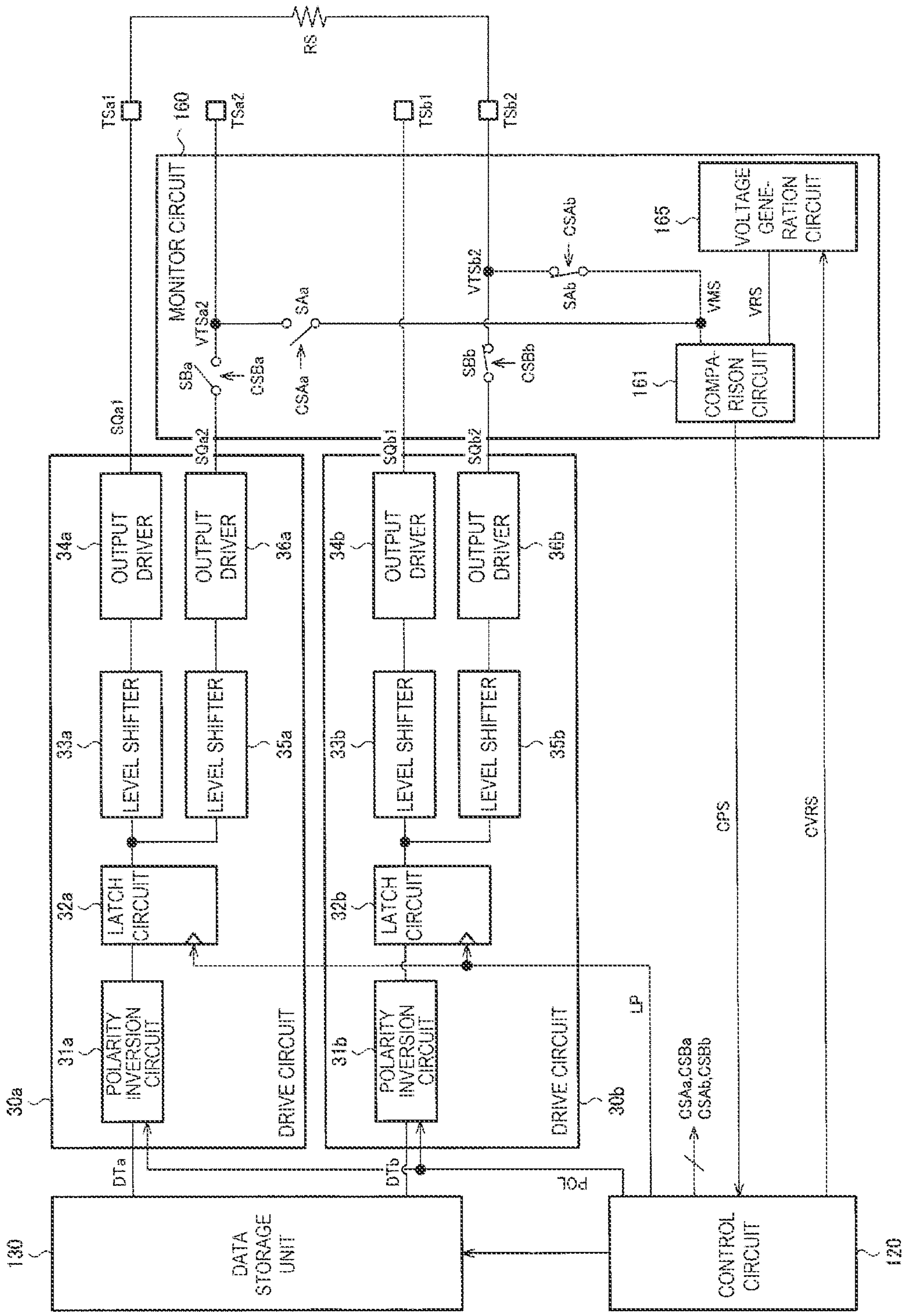
FIG. 13 shows a detailed configuration example of the segment drive circuit and the monitor circuit in the second configuration example and a first coupling example of a transparent electrode.

FIG. 13 shows a detailed configuration example of the segment drive circuit and the monitor circuit in the second configuration example and a first coupling example of a transparent electrode. In FIG. 13, the line latch 140 is not shown.

In the first coupling example, the transparent electrode is coupled between the segment terminal TSa1 corresponding to a first output of the drive circuit 30*a* and the segment terminal TSb2 corresponding to a second output of the drive circuit 30*b*. For example, the segment terminals TSa1, TSa2, TSb1, and TSb2 correspond to the segment terminals TS5, TS6, TS7, and TS8 in FIG. 12, and the drive circuits 30*a* and 30*b* correspond to the drive circuits 30-3 and 30-4 in FIG. 12.

The drive circuit 30*a* includes a polarity inversion circuit 31*a*, a latch circuit 32*a*, level shifters 33*a* and 35*a*, and output drivers 34*a* and 36*a*.

Operations of the polarity inversion circuit 31*a* and the latch circuit 32*a* are the same as operations of the polarity inversion circuit 11*a* and the latch circuit 12*a* in the first configuration example in FIG. 5. The level shifters 33*a* and 35*a* level-shift an output signal of the latch circuit 32*a*. The output driver 34*a* buffers an output signal of the level shifter 33*a* and outputs, to the segment terminal TSa1, the buffered signal as a signal SQa1. The output driver 36*a* buffers an output signal of the level shifter 35*a* and outputs the buffered signal as a signal SQa2. When the drive data DTa is the display data, the signals SQa1 and SQa2 are display segment drive signals, and when the drive data DTa is the first data, the signals SQa1 and SQa2 are the first voltages for resistance monitoring.

The drive circuit 30*b* includes a polarity inversion circuit 31*b*, a latch circuit 32*b*, level shifters 33*b* and 35*b*, and output drivers 34*b* and 36*b*.

Operations of the polarity inversion circuit 31*b* and the latch circuit 32*b* are the same as operations of the polarity inversion circuit 11*b* and the latch circuit 12*b* in the first configuration example in FIG. 5. The level shifters 33*b* and 35*b* level-shift an output signal of the latch circuit 32*b*. The output driver 34*b* buffers an output signal of the level shifter 33*b* and outputs, to the segment terminal TSb1, the buffered signal as a signal SQb1. The output driver 36*b* buffers an output signal of the level shifter 35*b* and outputs the buffered signal as a signal SQb2. When the drive data DTb is the display data, the signals SQb1 and SQb2 are display segment drive signals, and when the drive data DTb is the second data, the signals SQb1 and SQb2 are the second voltages for resistance monitoring.

The monitor circuit 160 includes switches SAa, SBa, SAb, and SBb, a comparison circuit 161, and a voltage generation circuit 165.

The switch SAa is provided between the segment terminal TSa2 and the first input terminal of the comparison circuit 161. That is, one end of the switch SAa is coupled to the segment terminal TSa2, and the other end thereof is coupled to the first input terminal. The switch SAa is controlled to be turned on or off by a control signal CSAa from the control circuit 120. The switch SBa is provided between the segment terminal TSa2 and an output of the output driver 36*a*. That is, one end of the switch SBa is coupled to the segment terminal TSa2, and the other end thereof is coupled to the output of the output driver 36*a*. The switch SBa is controlled to be turned on or off by a control signal CSBa from the control circuit 120. Each of the switches SAa and SBa includes, for example, one or more transistors.

The switch SAb is provided between the segment terminal TSb2 and the first input terminal of the comparison circuit 161. That is, one end of the switch SAb is coupled to the segment terminal TSb2, and the other end thereof is coupled to the first input terminal. The switch SAb is controlled to be turned on or off by a control signal CSAb from the control circuit 120. The switch SBb is provided between the segment terminal TSb2 and an output of the output driver 36*b*. That is, one end of the switch SBb is coupled to the segment terminal TSb2, and the other end thereof is coupled to the output of the output driver 36*b*. The switch SBb is controlled to be turned on or off by a control signal CSBb from the control circuit 120. Each of the switches SAb and SBb includes, for example, one or more transistors.

When the switch SAb is turned on, a voltage VTSb2 of the segment terminal TSb2 is input to the first input terminal of the comparison circuit 161 as the monitoring voltage VMS. The comparison circuit 161 compares the monitoring voltage VMS with the comparison determination voltage VRS, and outputs, to the control circuit 120, the result as a signal CPS. A resistance monitoring method is the same as the method shown in FIG. 8 or FIG. 9.

FIG. 14 shows an explanatory diagram of operations of the drive circuit and the monitor circuit in the first coupling example. The drive circuits 30*a* and 30*b* and the monitor circuit 160 in FIG. 13 are set to the display state or the monitoring state.

For example, when the segment electrodes are driven as in the drive circuits 30-3 and 30-4 in FIG. 12, the display state may be set in a display period and the monitoring state may be set in a monitoring period. Alternatively, when the segment signal line dedicated to resistance monitoring is coupled as in the drive circuits 30-9 and 30-10 in FIG. 12, the display state may not be set, and the monitoring state may be set in the monitoring period.

In both the display state and the monitoring state, the switch SAa is turned off and the switch SBa may be any switch.

In the one-line driving in the display state, the switch SAb is turned off, the switch SBb is turned off, the drive data DTa is the display data, and the drive data DTb may be any data. That is, the one-line driving is a state in which the segment electrodes are driven only by the first output of the drive circuit 30*a* in FIG. 13. In the two-line driving in the display state, the switch SAb is turned off, the switch SBb is turned on, the drive data DTa is the display data, and the drive data DTb is equal to the drive data DTa. That is, the two-line driving is a state in which the segment electrodes are driven by the first output of the drive circuit 30*a* and the second output of the drive circuit 30*b* in FIG. 13.

In the monitoring state, the switch SAb is turned on, the switch SBb is turned on, the drive data DTa is the first data, and the drive data DTb is the second data. At this time, the output driver 34*a* of the drive circuit 30*a* outputs the signal SQa1 of the first voltage, and the output driver 36*b* of the drive circuit 30*b* outputs the signal SQb2 of the second voltage.

FIG. 15 shows a detailed configuration example of the segment drive circuit and the monitor circuit in the second configuration example and a second coupling example of the transparent electrode.

In the second coupling example, the transparent electrode is coupled between the segment terminal TSa1 corresponding to the first output of the drive circuit 30*a* and the segment terminal TSb2 corresponding to the second output of the drive circuit 30*b*, and the segment terminals TSb1 and TSb2 are coupled by the transparent electrode. For example, the segment terminals TSa1, TSa2, TSb1, and TSb2 correspond to the segment terminals TS17, TS18, TS19, and TS20 in FIG. 12, and the drive circuits 30*a* and 30*b* correspond to the drive circuits 30-9 and 30-10 in FIG. 12.

FIG. 16 shows an explanatory diagram of operations of the drive circuit and the monitor circuit in the second coupling example. The drive circuits 30*a* and 30*b* and the monitor circuit 160 in FIG. 15 are set to the two-line driving in the display state or the monitoring state.

In both the display state and the monitoring state, the switch SAa is turned off and the switch SBa may be any switch.

In the two-line driving in the display state, the switch SAb is turned off, the switch SBb may be any switch, the drive data DTa is the display data, and the drive data DTb is equal to the drive data DTa.

In the monitoring state, the switch SAb is turned on, the switch SBb is turned off, the drive data DTa is the first data, and the drive data DTb is the second data. At this time, the output driver 34*a* of the drive circuit 30*a* outputs the signal SQa1 of the first voltage, and the output driver 34*b* of the drive circuit 30*b* outputs the signal SQb1 of the second voltage.

Figure 17:
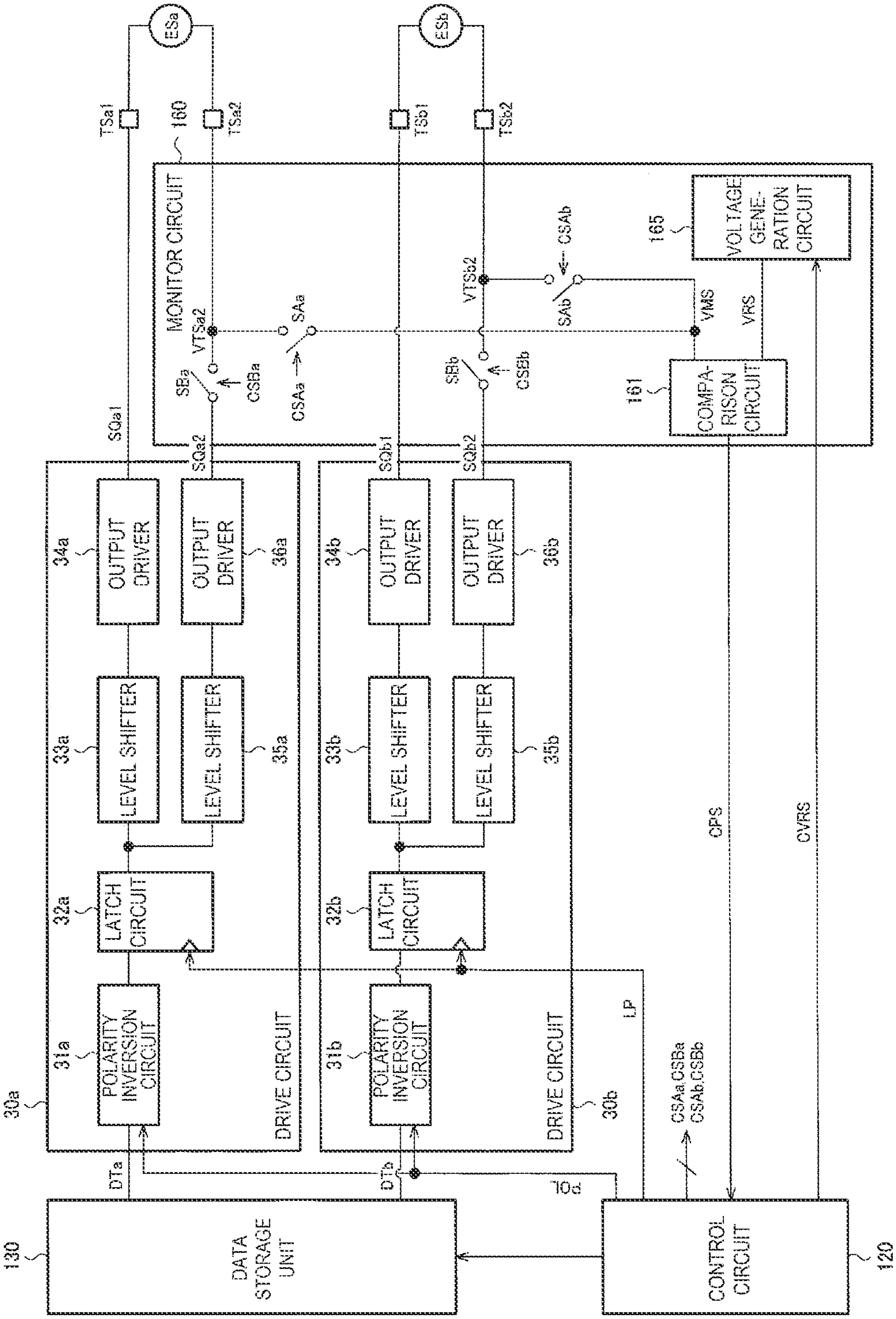
FIG. 17 shows a detailed configuration example of the segment drive circuit and the monitor circuit in the second configuration example and a third coupling example of the transparent electrode.

FIG. 17 shows a detailed configuration example of the segment drive circuit and the monitor circuit in the second configuration example and a third coupling example of the transparent electrode.

In the third coupling example, the transparent electrode including a segment electrode ESa is coupled between the segment terminal TSa1 corresponding to the first output of the drive circuit 30*a* and the segment terminal TSa2 corresponding to a second output of the drive circuit 30*a*. The transparent electrode including a segment electrode ESb is coupled between the segment terminal TSb1 corresponding to a first output of the drive circuit 30*b* and the segment terminal TSb2 corresponding to the second output of the drive circuit 30*b*. For example, the segment terminals TSa1, TSa2, TSb1, and TSb2 correspond to the segment terminals TS1, TS2, TS3, and TS4 in FIG. 12, the segment electrodes ESa and ESb correspond to the segment electrodes ES1 and ES2 in FIG. 12, and the drive circuits 30*a* and 30*b* correspond to the drive circuits 30-1 and 30-2 in FIG. 12.

FIG. 18 shows an explanatory diagram of operations of the drive circuit and the monitor circuit in the third coupling example. The drive circuits 30*a* and 30*b* and the monitor circuit 160 in FIG. 17 are set to the display state.

In the one-line driving, the switch SAa is turned off, the switch SBa is turned off, the switch SAb is turned off, the switch SBb is turned off, the drive data DTa is the display data, and the drive data DTb is the display data independent of the drive data DTa. That is, the one-line driving is a state in which the segment electrode ESa is driven only by the first output of the drive circuit 30*a* in FIG. 17, and the segment electrode ESb is driven only by the first output of the drive circuit 30*b*.

In the two-line driving, the switch SAa is turned off, the switch SBa is turned on, the switch SAb is turned off, the switch SBb is turned on, the drive data DTa is the display data, and the drive data DTb is the display data independent of the drive data DTa. That is, the two-line driving is a state in which the segment electrode ESa is driven by the first output and the second output of the drive circuit 30*a* in FIG. 17, and the segment electrode ESb is driven by the first output and the second output of the drive circuit 30*b*.

Although the embodiment has been described in detail above, it can be easily understood by those skilled in the art that many modifications are possible without substantially departing from the novel matters and effects of the disclosure. Accordingly, all such modifications are within the scope of the disclosure. For example, a term described at least once together with a different term having a broader meaning or the same meaning in the description or the drawings can be replaced with the different term at any place in the description or the drawings. All combinations of the embodiment and the modifications are also included in the scope of the disclosure. The configurations and operations of the driver, the electro-optical panel, the electro-optical device, the processing device, and the electronic apparatus are not limited to those described in the embodiment, and various modifications are possible.

What is claimed is:

1. A driver comprising:

a first terminal;

a second terminal coupled to the first terminal via a transparent electrode provided at an electro-optical panel;

a first drive circuit coupled to the first terminal and configured to drive the first terminal;

a second drive circuit coupled to the second terminal and configured to drive the second terminal; and a monitor circuit configured to detect a resistance value of the transparent electrode based on a voltage of only the second terminal among the first and second terminals in a monitoring state, wherein the monitoring circuit includes:

a comparison circuit including a first input terminal to which a comparison determination voltage is input;

a first switch provided between the second terminal and a second input terminal of the comparison circuit and configured to be turned on in the monitoring state; and a second switch provided between the second terminal and an output of the second drive circuit and configured to be turned on in the monitoring state, wherein the second switch is turned on when opening between the first terminal and the second terminal is detected, and the monitoring state is:

a state in which the first terminal is coupled to a first high-potential-side power supply voltage via the first drive circuit and the second terminal is coupled to a second high-potential-side power supply voltage different from the first high-potential-side power supply voltage via the second drive circuit; or a state in which the first terminal is coupled to one of a high-potential-side power supply voltage and a low-potential-side power supply voltage lower than the high-potential-side power supply voltage via the first drive circuit and the second terminal is coupled to the other of the high-potential-side power supply voltage and the low-potential-side power supply voltage via the second drive circuit.

2. The driver according to claim 1, wherein the second switch is turned off when a display electrode provided in the transparent electrode is driven for display by the first drive circuit.

3. The driver according to claim 1, wherein the monitor circuit includes a voltage generation circuit configured to generate a comparison determination voltage, and a comparison circuit configured to compare the comparison determination voltage with the voltage of the second terminal.

4. The driver according to claim 3, further comprising:

a storage circuit in which a voltage value of the comparison determination voltage is set.

5. The driver according to claim 1, wherein the first drive circuit includes a first transistor provided between a node of the first high-potential-side power supply voltage and the first terminal, and a second transistor provided between the first terminal and a node of the low-potential-side power supply voltage, the second drive circuit includes a third transistor provided between a node of the second high-potential-side power supply voltage and the second terminal, and a fourth transistor provided between the second terminal and a node of the low-potential-side power supply voltage, and in the monitoring state in which the first terminal is coupled to the first high-potential-side power supply voltage via the first drive circuit and the second terminal is coupled to the second high-potential-side power supply voltage via the second drive circuit, the first transistor and the third transistor are turned on, and the second transistor and the fourth transistor are turned off.

6. The driver according to claim 1, wherein the first drive circuit includes a first transistor provided between a node of the high-potential-side power supply voltage and the first terminal, and a second transistor provided between the first terminal and a node of the low-potential-side power supply voltage, the second drive circuit includes a third transistor provided between a node of the high-potential-side power supply voltage and the second terminal, and a fourth transistor provided between the second terminal and a node of the low-potential-side power supply voltage, and in the monitoring state in which the first terminal is coupled to one of the high-potential-side power supply voltage and the low-potential-side power supply voltage via the first drive circuit, the second terminal is coupled to the other of the high-potential-side power supply voltage and the low-potential-side power supply voltage via the second drive circuit, the first transistor and the fourth transistor are turned to be one of on and off, and the second transistor and the third transistor are turned to be the other of on and off.

7. The driver according to claim 1, further comprising:

a data storage unit configured to store display data, first data for setting a voltage coupled to the first terminal in the monitoring state, and second data for setting a voltage coupled to the second terminal in the monitoring state.

8. The driver according to claim 1, further comprising:

an interface circuit configured to notify an external processing system of an abnormality in the resistance value when the abnormality is detected.

9. An electro-optical device comprising:

the driver according to claim 1; and the electro-optical panel provided with the transparent electrode.

10. A driver comprising:

a first terminal;

a second terminal coupled to the first terminal via a transparent electrode provided at an electro-optical panel;

a first drive circuit coupled to the first terminal and configured to drive the first terminal;

a second drive circuit coupled to the second terminal and configured to drive the second terminal; and a monitor circuit configured to detect a resistance value of the transparent electrode based on a voltage of the second terminal in a monitoring state, wherein the monitoring state is a state in which the first terminal is coupled to a first high-potential-side power supply voltage via the first drive circuit and the second terminal is coupled to a second high-potential-side power supply voltage different from the first high-potential-side power supply voltage via the second drive circuit, the first drive circuit includes:

a first transistor provided between a node of the first high-potential-side power supply voltage and the first terminal; and a second transistor provided between the first terminal and a node of the low-potential-side power supply voltage, the second drive circuit includes:

a third transistor provided between a node of the second high-potential-side power supply voltage and the second terminal; and a fourth transistor provided between the second terminal and a node of the low-potential-side power supply voltage, and in the monitoring state, the first transistor and the third transistor are turned on, and the second transistor and the fourth transistor are turned off.

11. A driver comprising:

a first terminal;

a second terminal coupled to the first terminal via a transparent electrode provided at an electro-optical panel;

a first drive circuit coupled to the first terminal and configured to drive the first terminal;

a second drive circuit coupled to the second terminal and configured to drive the second terminal; and a monitor circuit configured to detect a resistance value of the transparent electrode based on a voltage of the second terminal in a monitoring state, wherein the monitoring state is:

a state in which the first terminal is coupled to a first high-potential-side power supply voltage via the first drive circuit and the second terminal is coupled to a second high-potential-side power supply voltage different from the first high-potential-side power supply voltage via the second drive circuit; or a state in which the first terminal is coupled to one of a high-potential-side power supply voltage and a low-potential-side power supply voltage lower than the high-potential-side power supply voltage via the first drive circuit and the second terminal is coupled to the other of the high-potential-side power supply voltage and the low-potential-side power supply voltage via the second drive circuit, the first drive circuit includes:

a first transistor provided between a node of the high-potential-side power supply voltage and the first terminal; and a second transistor provided between the first terminal and a node of the low-potential-side power supply voltage, the second drive circuit includes:

a third transistor provided between a node of the high-potential-side power supply voltage and the second terminal; and a fourth transistor provided between the second terminal and a node of the low-potential-side power supply voltage, and in the monitoring state in which the first terminal is coupled to one of the high-potential-side power supply voltage and the low-potential-side power supply voltage via the first drive circuit, the second terminal is coupled to the other of the high-potential-side power supply voltage and the low-potential-side power supply voltage via the second drive circuit, the first transistor and the fourth transistor are turned to be one of on and off, and the second transistor and the third transistor are turned to be the other of on and off.

* * * * *